(12) United States Patent
Yoshinaga

(10) Patent No.: US 11,885,720 B2
(45) Date of Patent: Jan. 30, 2024

(54) TIME SERIES DATA PROCESSING METHOD

(71) Applicant: NEC Corporation, Tokyo (JP)

(72) Inventor: Naoki Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 17/764,639

(22) PCT Filed: Oct. 18, 2019

(86) PCT No.: PCT/JP2019/041013
§ 371 (c)(1),
(2) Date: Mar. 29, 2022

(87) PCT Pub. No.: WO2021/075039
PCT Pub. Date: Apr. 22, 2021

(65) Prior Publication Data
US 2022/0334030 A1 Oct. 20, 2022

(51) Int. Cl.
*G06F 11/30* (2006.01)
*G01M 99/00* (2011.01)

(52) U.S. Cl.
CPC ................ *G01M 99/005* (2013.01)

(58) Field of Classification Search
CPC .................................................. G01M 99/005
See application file for complete search history.

(56) References Cited

U.S. PATENT DOCUMENTS

2014/0344624 A1  11/2014  Nishikawa et al.

FOREIGN PATENT DOCUMENTS

| JP | 2008-059270 A | | 3/2008 | |
|---|---|---|---|---|
| JP | 2008059270 A | * | 3/2008 | |
| JP | 2014-228887 A | | 12/2014 | |
| JP | 2018-148350 A | | 9/2018 | |
| WO | 2011/036809 A1 | | 3/2011 | |
| WO | WO-2011036809 A1 | * | 3/2011 | ......... G05B 23/0235 |

OTHER PUBLICATIONS

International Search Report for PCT Application No. PCT/JP2019/041013, dated Dec. 24, 2019.

* cited by examiner

*Primary Examiner* — Phuong Huynh

(57) ABSTRACT

A time series data processing apparatus according to the present invention includes an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

10 Claims, 21 Drawing Sheets

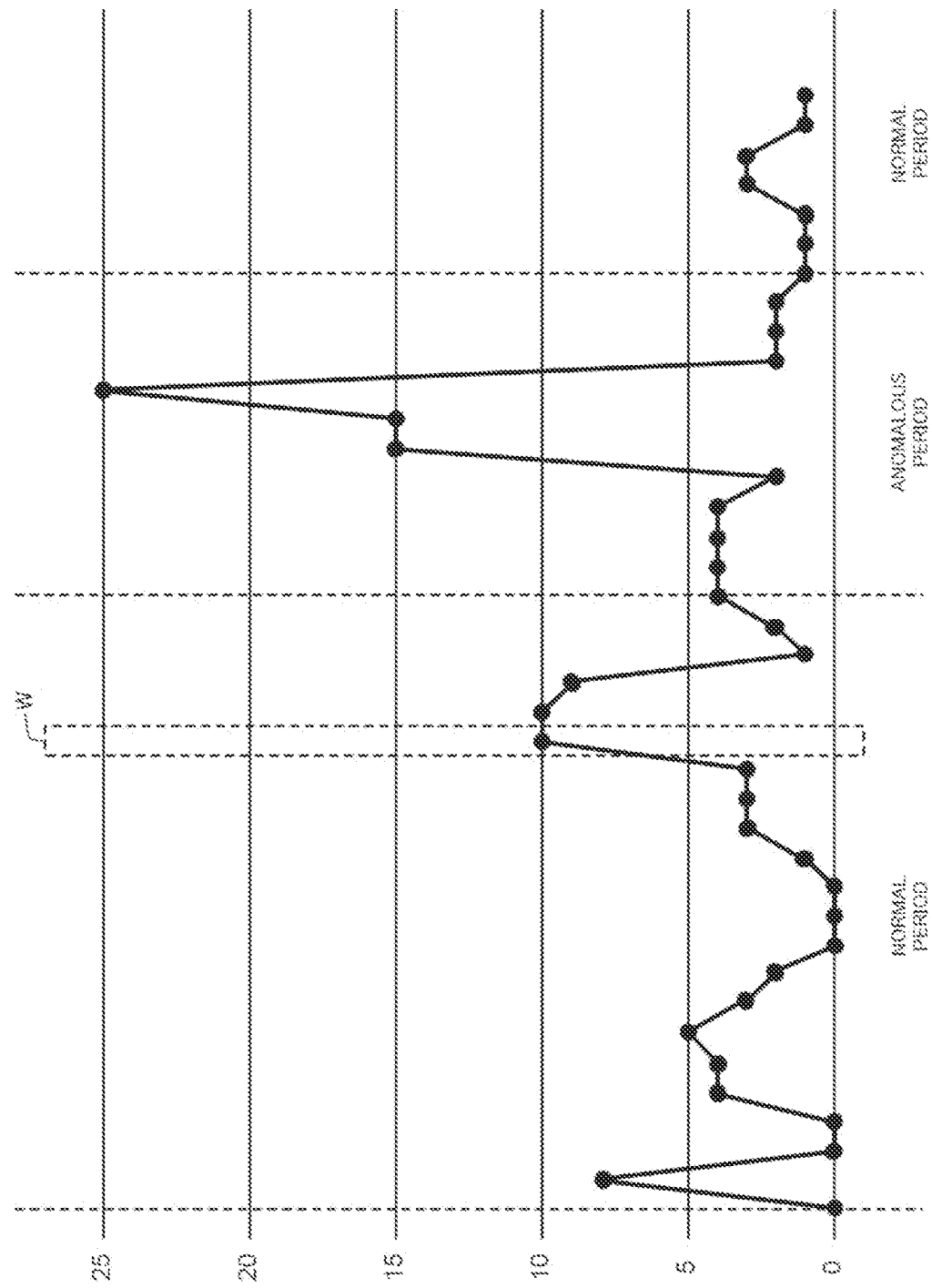

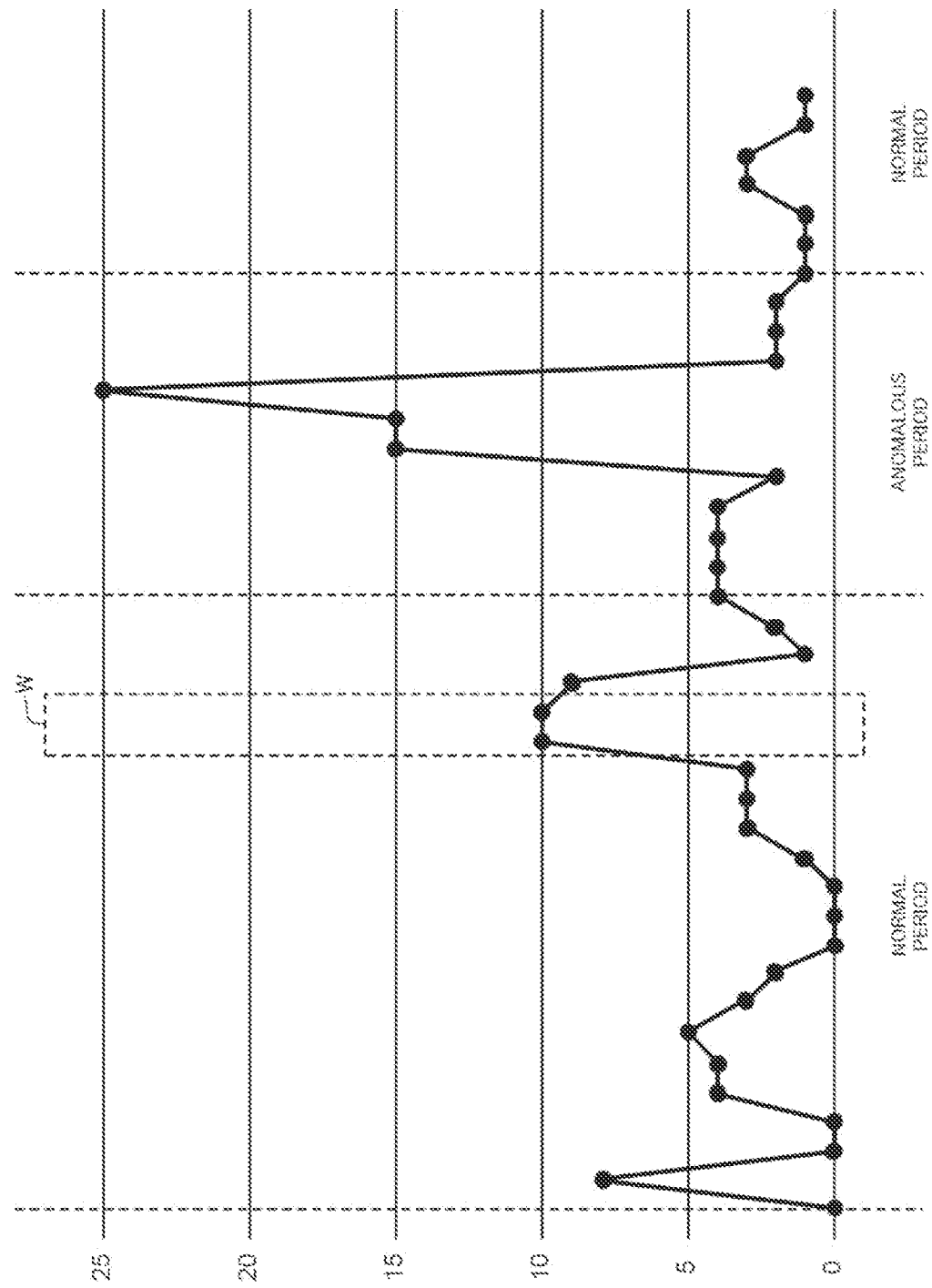

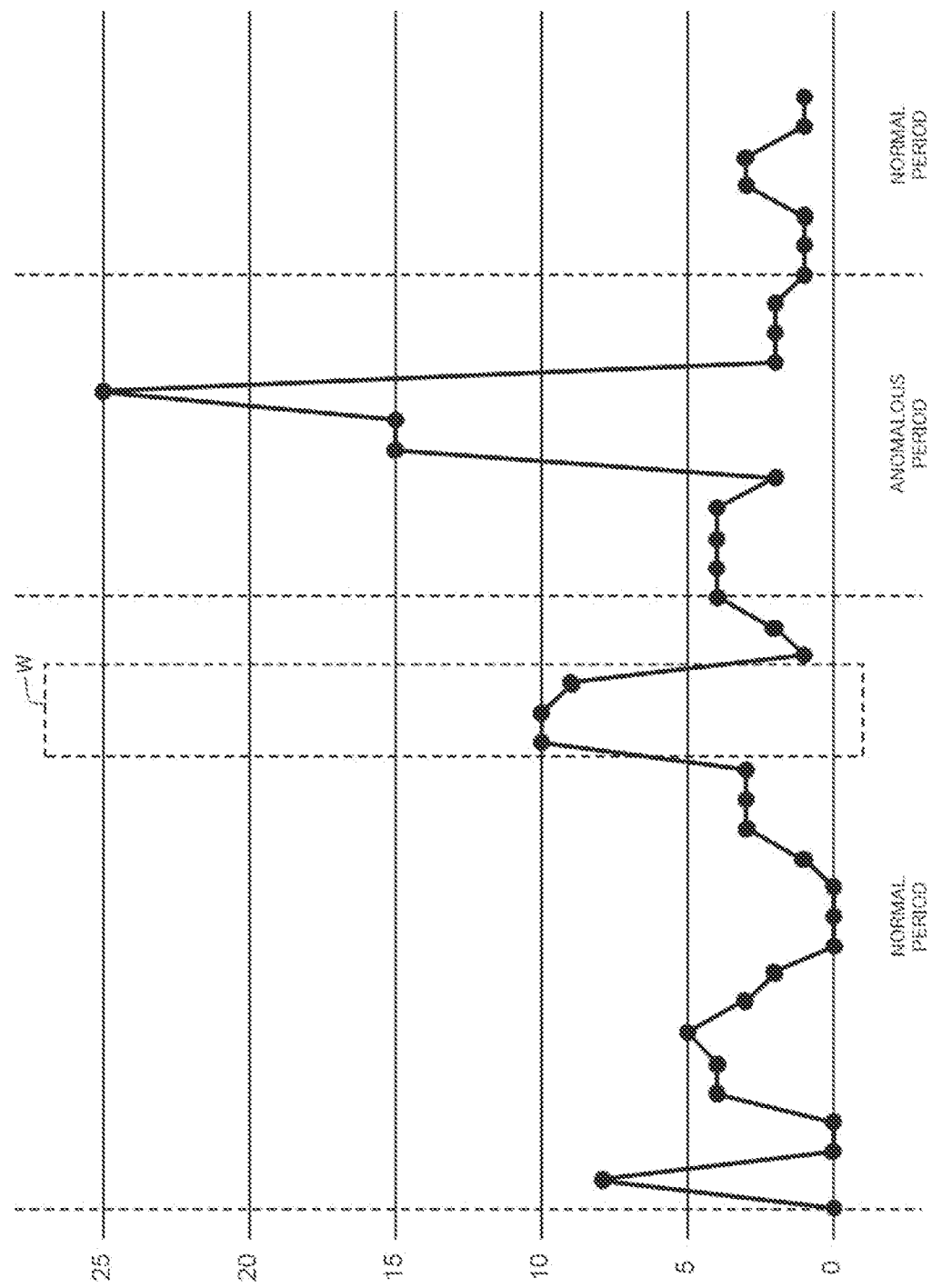

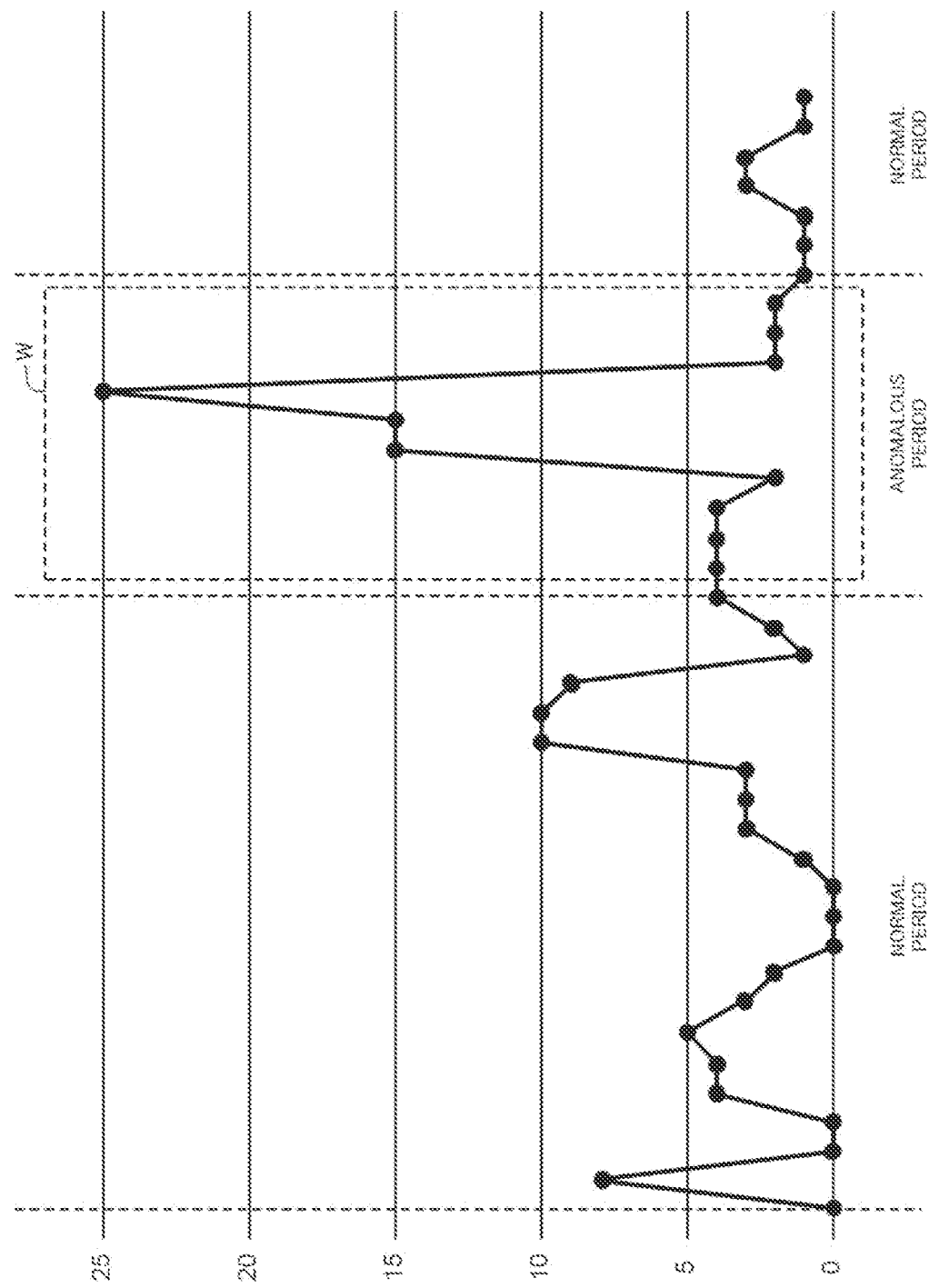

Fig.12

| PERIOD | COVERAGE VALUE [DURATION, ANOMALY DEGREE] |
|---|---|
| NORMAL | [1, 10], [3, 9], [4, 3], [7, 1], [9, 0] |
| ANOMALOUS 1 | [1, 25], [3, 15], [10, 2] |
| ANOMALOUS 2 | [1, 40] |
| ... | ... |

Fig.13

| MINIMUM COVERAGE VALUE | ANOMALY PERIOD 1 ||||  ANOMALY PERIOD 2 |||  HIGHEST VALUE |
|---|---|---|---|---|---|---|---|
|  | [1,25] | [3,15] | [10,2] | MINIMUM VALUE | [1,40] | MINIMUM VALUE |  |
| [1,10] | 0.4 | 0.66 | 5 | 0.4 | 0.25 | 0.25 | 0.4 |
| [3,9] | 3 | 1 | 4.5 | 1 | 3 | 3 | 3 |
| [4,3] | 4 | 1.33 | 1.5 | 1.33 | 4 | 4 | 4 |
| [7,1] | 7 | 2.33 | 0.7 | 0.7 | 7 | 7 | 7 |
| [9,0] | 9 | 3 | 0.9 | 0.9 | 9 | 9 | 9 |
| MINIMUM VALUE AMONG ALL CANDIDATES |||||||  0.4 |

TIME SERIES DATA PROCESSING METHOD

This application is a National Stage Entry of PCT/JP2019/041013 filed on Oct. 18, 2019, the contents of all of which are incorporated herein by reference, in their entirety.

TECHNICAL FIELD

The present invention relates to a time series data processing method, a time series data processing apparatus, and a program.

BACKGROUND ART

There are industrial plants to manufacture energy (electricity, gas, clean water, and so on), petrochemical products (crude oil, gasoline, plastics, and so on), foods, pharmaceuticals, and so on, and chemical plants such as factory facilities and apparatuses to produce chemical products. In these plants and equipment or large machine such as an information processing system, time series data, which are measurement values from various kinds of sensors, are analyzed and the occurrence of an anomalous state is detected and output. For example, in Patent Document 1, by collecting time series data such as CPU usage from a network configured by connecting a plurality of nodes such as a router and a server device as a monitoring target, and comparing a degree of anomaly calculated from the time series data with a threshold value, the occurrence of an anomalous state is detected.

Patent Document 1: Japanese Unexamined Patent Application Publication No. JP-A2018-148350

In Patent Document 1 mentioned above, a threshold value compared with a degree of anomaly calculated from time series data may be set in advance, or a new threshold value calculated from the result of aggregation of the presence or absence of anomaly or the presence or absence of detection in the past may be calculated and set. As an example, in Patent Document 1, the number of false positives and the number of oversights are calculated from the result of aggregation. Then, the threshold value is calculated so as to increase more as the number of false positives is more, and the threshold value is calculated so as to decrease less as the number of oversights is more. However, the occurrence of false positives and oversights of an anomalous state in time series data is not necessarily frequent. Therefore, there is a problem that it is difficult to set an appropriate threshold value.

Further, as a threshold value for detecting the occurrence of an anomalous state based on a degree of anomaly calculated from time series data of a monitoring target, a combination of two threshold values such as "degree of anomaly" and "duration" can also be considered. For example, time series data such as an anomaly degree graph D2 calculated based on a predetermined analysis parameter A from a time series data set D1 of a plurality of measurement values as shown in FIG. 1 will be considered. In this case, first, a normal period in which a monitoring target is actually in a normal state and an anomalous period in which the monitoring target is in an anomalous state are set on the anomaly degree graph D2. Then, from the anomalous period on the anomaly degree graph D2, as shown in FIG. 2, a plurality of candidates for the threshold value can be considered, such as (threshold value A1) "a case where a degree of anomaly exceeds 30 even for a moment", (threshold value A2) "a case where a degree of anomaly exceeds 25 for a short period", and (threshold value A3) "a case where a degree of anomaly exceeds 10 for a long period". Moreover, an anomaly degree graph D3 calculated based on an analysis parameter B different from the above from the time series data set D1 of the plurality of measurement values as shown in FIG. 3 may be used. In this case, candidates for the threshold value different from the above as denoted by reference numerals B1 and B2 may be considered.

Although the threshold value may be set to the lowest possible value to securely detect an anomalous state, a false positive also occurs. On the other hand, in a case where the threshold value is set to the upper limit of an anomalous value so that a false positive does not occur, an anomalous state may not be detected. Thus, it is difficult to set an appropriate threshold value which balances a detection rate and a false positive rate. Therefore, even if a plurality of candidates for the threshold value are extracted as described above, it is difficult to determine which of the threshold values is appropriate, and the candidates may possibly include an inappropriate one in the first place. As a result, it is difficult to set an appropriate threshold value.

Furthermore, since the frequency of the occurrence of an anomalous case is small in general, it is also difficult to obtain the threshold value from the anomalous period on the anomaly degree graph in the above manner.

SUMMARY

Accordingly, an object of the present invention is to provide a time series data processing method which can solve the abovementioned problem that it is difficult to set an appropriate threshold value in the case of detecting an anomalous state based on time series data.

A time series data processing method as an aspect of the present invention includes extracting, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

Further, a time series data processing apparatus as an aspect of the present invention includes an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

Further, a computer program as an aspect of the present invention includes instructions for causing an information processing apparatus to realize an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

With the configurations as described above, the present invention enables setting of an appropriate threshold value in the case of detecting an anomalous state based on time series data.

BRIEF DESCRIPTION OF DRAWINGS

FIG. 7 is a view showing an image of processing of the time series data by the time series data processing apparatus disclosed in FIG. 4;

FIG. 8 is a view showing an image of processing of the time series data by the time series data processing apparatus disclosed in FIG. 4;

FIG. 9 is a view showing an image of processing of the time series data by the time series data processing apparatus disclosed in FIG. 4;

FIG. 10 is a view showing an image of processing of the time series data by the time series data processing apparatus disclosed in FIG. 4;

FIG. 12 is a view showing an image of processing of the time series data by the time series data processing apparatus disclosed in FIG. 4;

FIG. 13 is a view showing an image of processing of the time series data by the time series data processing apparatus disclosed in FIG. 4;

EXAMPLE EMBODIMENTS

First Example Embodiment

Figure 4:
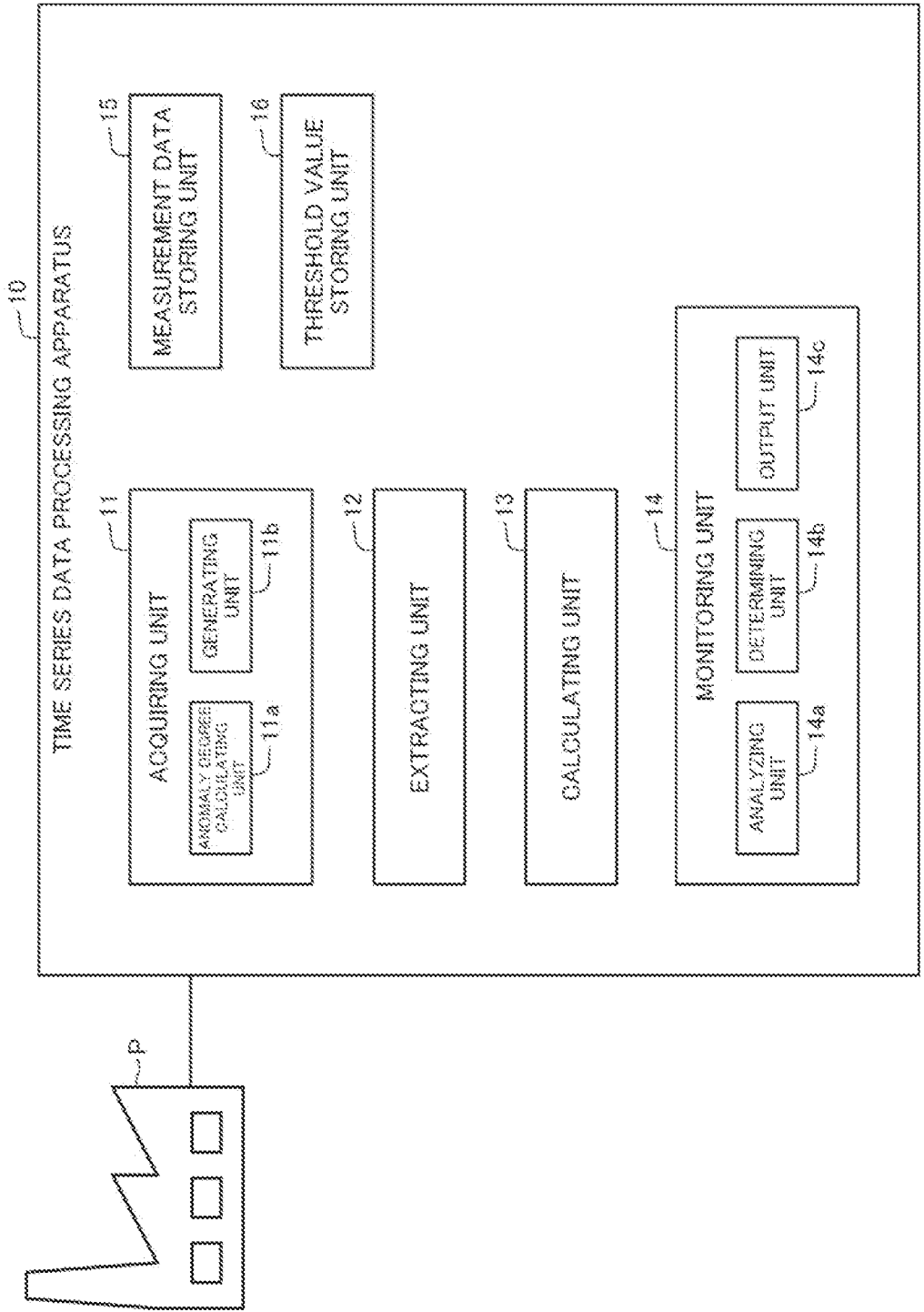
FIG. 4 is a block diagram showing a configuration of a time series data processing apparatus in a first example embodiment of the present invention.

A first example embodiment of the present invention will be described with reference to FIGS. 4 to 15. FIG. 4 is a view for describing a configuration of a time series data processing apparatus, and FIGS. 5 to 15 are views for describing a processing operation by the time series data processing apparatus.

[Configuration]

A time series data processing apparatus 10 according to the present invention is connected to a measurement target P such as a plant. The time series data processing apparatus 10 acquires and analyzes the measurement value of at least one or more data items of the measurement target P, and monitors the state of the measurement target P based on the analysis result. For example, the measurement target P is a plant such as a manufacturing factory or a processing facility, and the measurement values of the respective data items include the values of a plurality of kinds of data items such as temperature, pressure, flow rate, power consumption value, supply amount of raw material and remaining amount in the plant. In this example embodiment, the state of the measurement target P to be monitored is an anomalous state of the measurement target P, and the time series data processing apparatus 10 detects the anomalous state from a degree of anomaly calculated based on a predetermined analysis parameter from the measurement values of the respective data items, and outputs notification information for notifying the anomalous state. In the case of determining that the measurement target P is in a normal state, the time series data processing apparatus 10 may output notification information for notifying the normal state to an administrator or a device used by the administrator. Moreover, the time series data processing apparatus 10 according to the present invention extracts candidates for a threshold value for detecting the anomalous state from a degree of anomaly, and sets the threshold value selected from among the candidates as will be described later.

The measurement target P in the present invention is not limited to a plant, and may be anything, for example, a facility such as an information processing system. For example, in a case where the measurement target P is an information processing system, the time series data processing apparatus 10 may monitor the state of the information processing system by measuring the CPU (Central Processing Unit) usage, memory usage, disk access frequency, number of input/output packets, input/output packet rate, power consumption value and so on of each of the information processing apparatuses such as a device and a server configuring the information processing system as the measurement values of the respective data items, and analyzing the measurement values.

The time series data processing apparatus 10 described above is configured by one or a plurality of information processing apparatuses each including an arithmetic logic unit and a storage unit. The time series data processing apparatus 10 includes an acquiring unit 11, an extracting unit 12, a calculating unit 13, and a monitoring unit 14 as shown in FIG. 4. The functions of the respective units of the acquiring unit 11, the extracting unit 12, the calculating unit 13 and the monitoring unit 14 can be realized by the arithmetic logic unit executing a program for realizing the respective functions stored in the storage unit. The time series data processing apparatus 10 also includes a measurement data storing unit 15 and a threshold value storing unit 16. The measurement data storing unit 15 and the threshold value storing unit 16 are configured by the storage unit. The respective components will be described in detail below.

Figure 1:
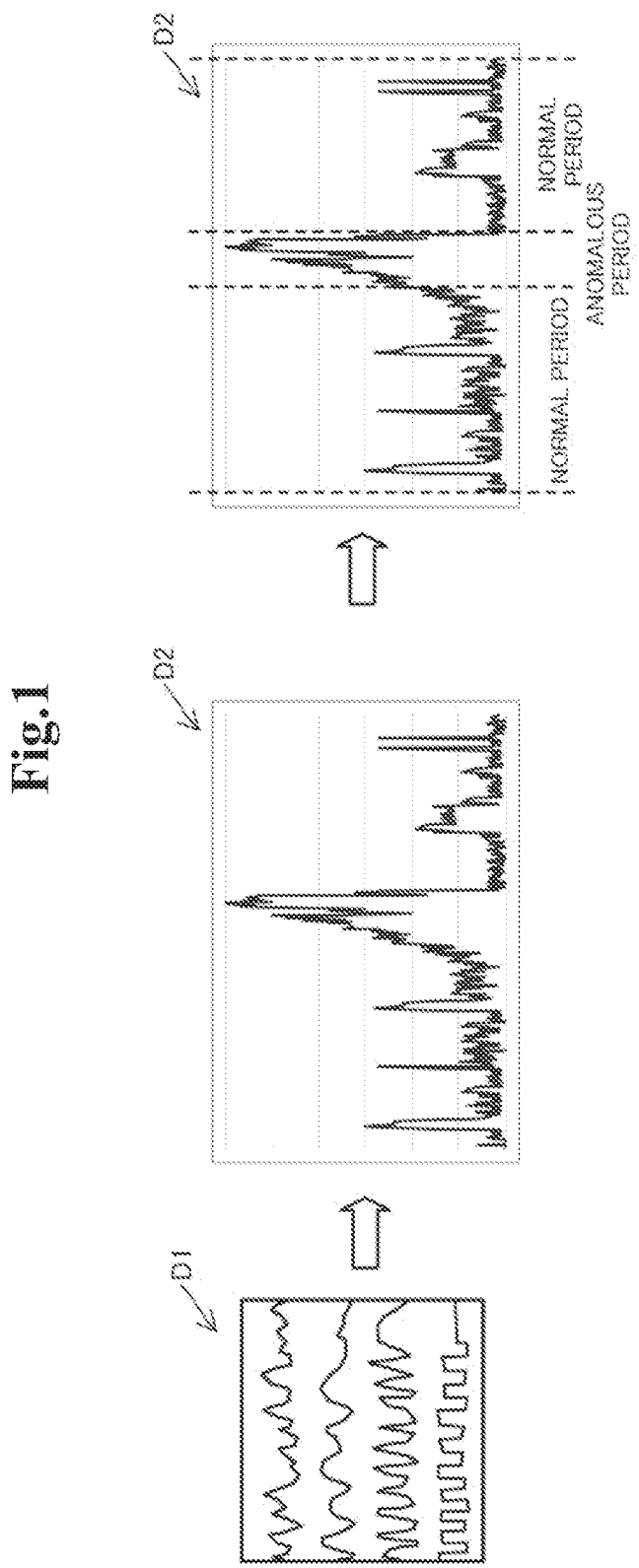
FIG. 1 is a view showing an example of an anomaly degree graph, which is time series data.
Figure 2:
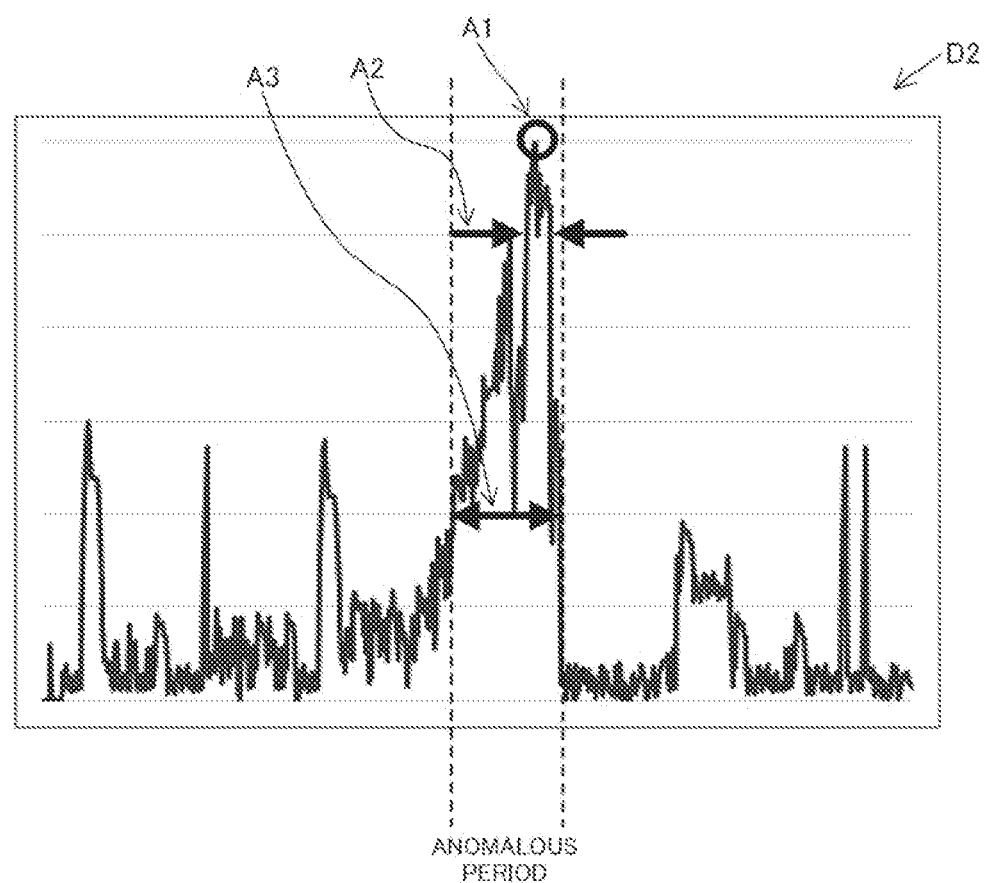
FIG. 2 is a view showing an example in which a candidate for a threshold value for detecting an anomalous state is extracted from the anomaly degree graph.
Figure 3:
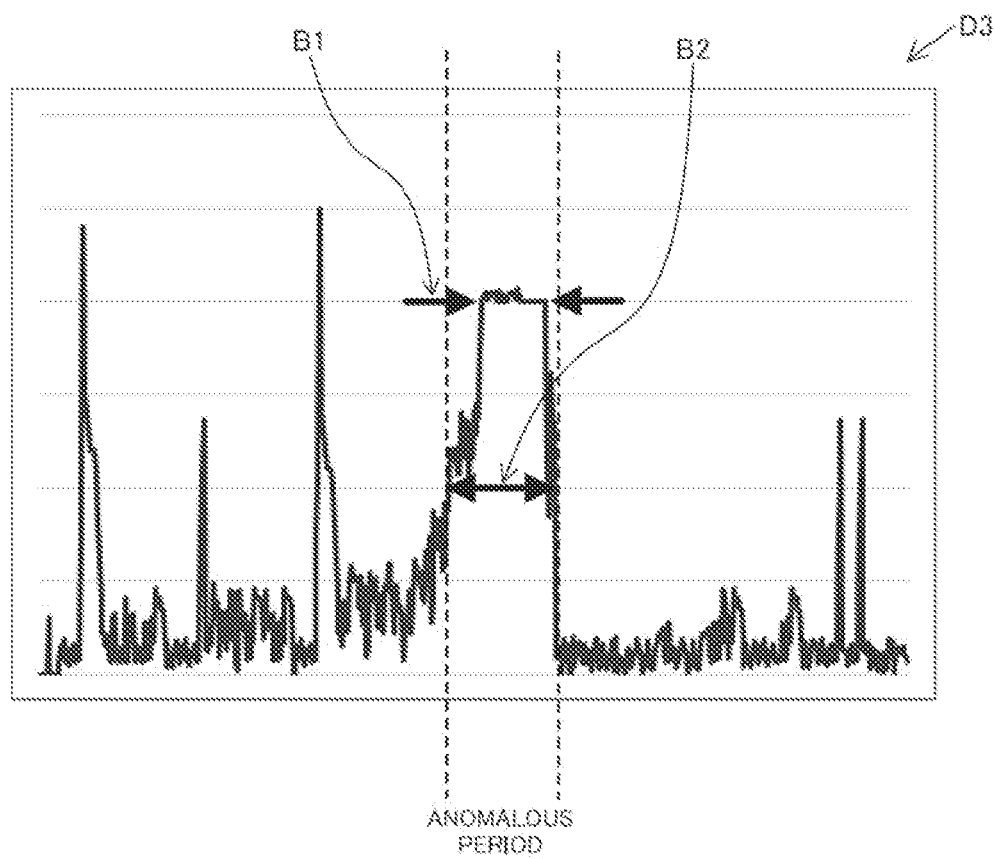
FIG. 3 is a view showing an example in which a candidate for a threshold value for detecting an anomalous state is extracted from the anomaly degree graph.

The acquiring unit 11 acquires the measurement values of the respective data items measured by various types of sensors installed in the measurement target P at predetermined time intervals as time series data, and stores into the measurement data storing unit 15. Since there are a plurality of kinds of data items to be measured, the acquiring unit 11 acquires a time series data set, which is the set of time series data of the plurality of data items as denoted by reference numeral D1 in FIG. 1. The acquisition and storage of the time series data set by the acquiring unit 11 is performed at all times, and the acquired time series data sets are used at the time of setting a threshold value used for detecting an anomalous state of the measurement target P and at the time of monitoring the state of the measurement target P, respectively, as will be described later.

Further, the acquiring unit 11 includes an anomaly degree calculating unit 11a and a generating unit 11b. The anomaly degree calculating unit 11a calculates a degree of anomaly representing a degree to which the state of the measurement target P is in an anomalous state, from the time series data set acquired from the monitoring target P. The generating unit 11b generates an anomaly degree graph, which is the time series data of the value of the degree of anomaly, and stores into the measurement data storing unit 15. Herein, a degree of anomaly is a value obtained by analyzing the measurement value of each data item at each time in the abovementioned time series data set based on an analysis parameter, and is a value such that a degree to which the state is determined to be an anomalous state becomes higher as the value is higher and the value is kept for a longer time. For example, the value of one of predetermined two kinds of data items is input into a prediction model relating to the values of the two kinds data items, a prediction value of the other of the data items is output from the prediction model, a difference between the prediction value and an actual measurement value is examined, and a degree of anomaly is calculated in accordance with the magnitude of the difference, the number of correlation failures, and so on. In this case, for example, a degree to which the measurement target P is in an anomalous state is considered to be higher as a degree of correlation failure is larger, and the value of a degree of anomaly is calculated higher. However, the method of calculating a degree of anomaly by the anomaly degree calculating unit 11a is not limited to the abovementioned method, and may be any method.

Figure 5:
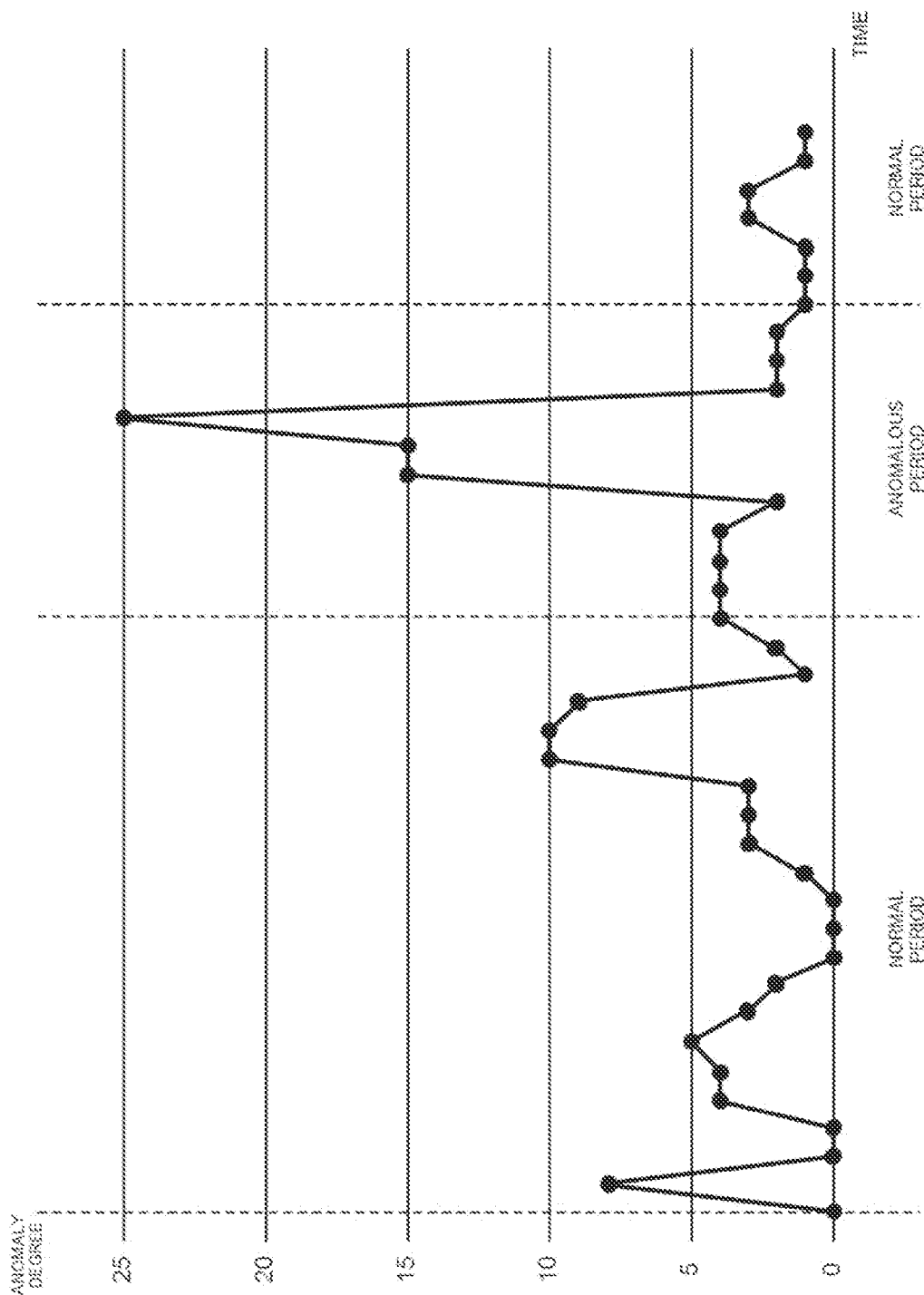
FIG. 5 is a view showing an image of processing of the time series data by the time series data processing apparatus disclosed in FIG. 4.

An example of the anomaly degree graph generated by the generating unit 11b is shown in FIG. 5. As shown in FIG. 5, in the anomaly degree graph, the vertical axis takes a degree of anomaly and the horizontal axis takes the time. The anomaly degree graph is time series data in which the value of a degree of anomaly varies with a lapse of time, and includes a plurality of parameters (variables) such as "value of anomaly degree" (another parameter) and "duration" during which the value of anomaly degree is kept (a predetermined parameter).

Further, an anomaly degree graph generated by the generating unit 11b may include the state of the measurement target P. Specifically, the generating unit 11b generates an anomaly degree graph including which period in a measurement target period is a normal period and which period is an anomalous period. At this time, the generating unit 11b generates an anomaly degree graph including the state of the measurement target P by, for example, setting the state of the measurement target P determined in the past time already passed, that is, a normal period of a normal state and an anomalous period of an anomalous state in association with the time in the anomaly degree graph. One example of the anomaly degree graph including the state is shown in FIG. 5. In the example of FIG. 5, the state varies with a lapse of time in order of a normal period, an anomalous period, and a normal period, but another anomalous period may be further set. In this case, the different anomalous periods are discriminated from each other as will be described later.

The extracting unit 12 extracts a candidate for a threshold value that is a combination of "value of anomaly degree" and "duration" to be the limit for determining that the measurement target P is in a normal state, by using the anomaly degree graph of the normal period in which the measurement target P is determined to be in the normal state set as described above. In other words, the candidate for the threshold value is a value determined to be an anomalous state when both "anomaly degree" and "duration" exceed the value. Herein, the threshold value that is the combination of "value of anomaly degree" and "duration" will be referred to as "minimum coverage value" (also referred to as "normal period maximum value" hereinafter). A method for extracting a minimum coverage value will be described below with reference to FIGS. 6 to 9.

First, the extracting unit 12 targets all normal periods in an anomaly degree graph for a process of extracting a minimum coverage value. In an example shown by FIGS. 6 to 9, the extracting unit 12 targets only a normal period on the left side for the process of extracting a minimum coverage value, but actually targets all normal periods. Then, the extracting unit 12 sets "maximum value of duration". For example, the extracting unit 12 sets, as "maximum value of duration", a period such as the shortest anomalous period, the longest normal period, or one day.

Figure 6:
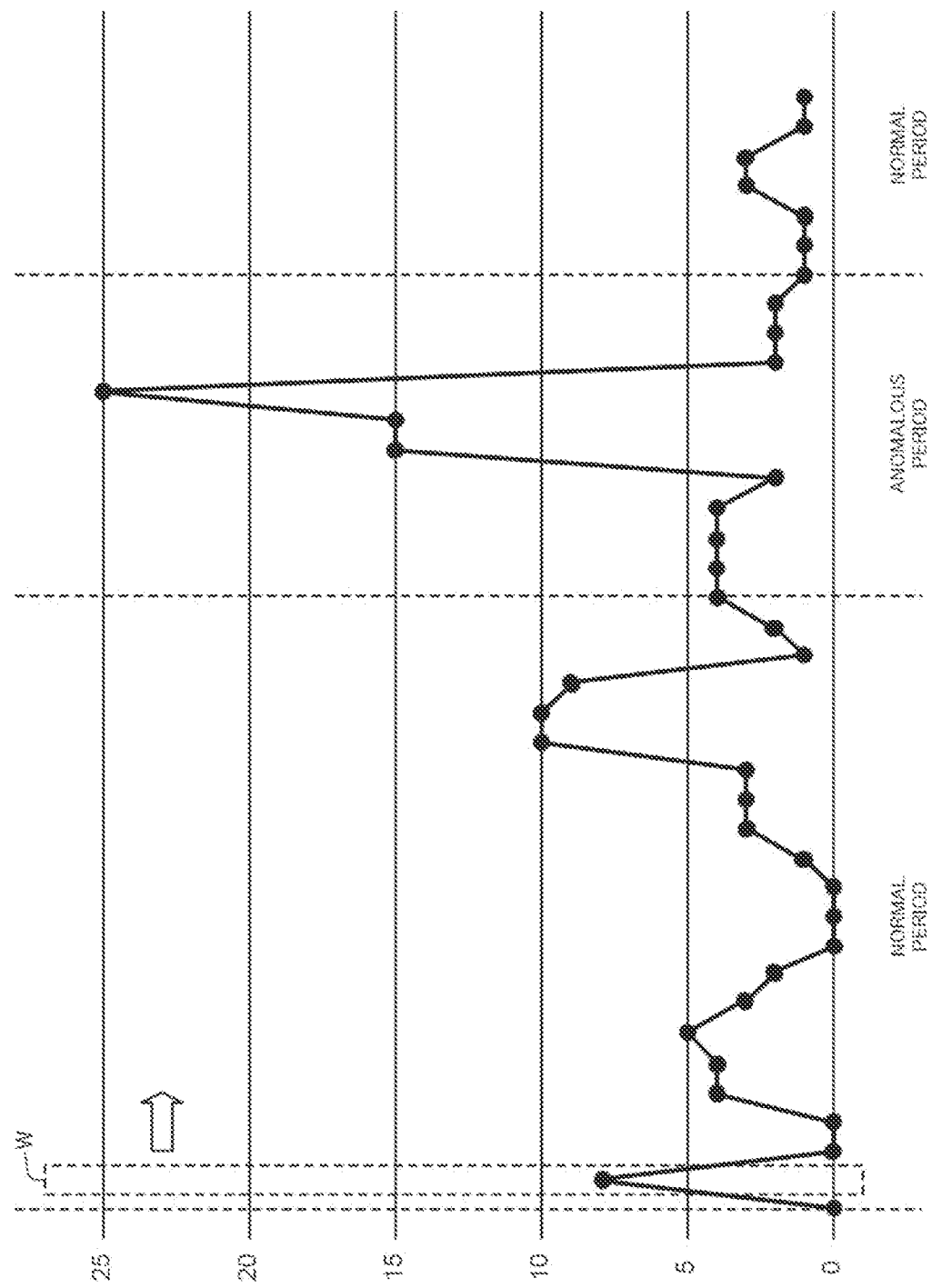
FIG. 6 is a view showing an image of processing of the time series data by the time series data processing apparatus disclosed in FIG. 4.

Subsequently, the extracting unit 12 sets a window W of a duration having a smaller value than the abovementioned "maximum value of duration" on the anomaly degree graph, and obtains the maximum value of the degree of anomaly within the window W. At this time, as shown in FIG. 6, the extracting unit 12 first sets a window W of a duration having the minimum value "1", and obtains the maximum value of the degree of anomaly while sliding the window W on the anomaly degree graph as shown by an arrow in FIG. 6. Then, in the case of the duration "1", the maximum value of the degree of anomaly is "10" as shown in FIG. 7. Consequently, as the minimum coverage value that is the combination of "duration, anomaly degree", [1, 10] is extracted first.

After that, as shown in FIG. 8, the extracting unit 12 increases the duration by "+1" to set a window W of a duration "2", and obtains the maximum value of the degree of anomaly while sliding the window W on the anomaly degree graph. That is to say, the extracting unit 12 obtains the maximum value of the degree of anomaly when the duration "2" is kept. Then, in the case of the duration "2", the maximum value of the degree of anomaly is "10" as shown in FIG. 8. Consequently, [2, 10] is extracted as the minimum coverage value that is the combination of "duration, anomaly degree". However, in a case where the anomaly degree "10" of the newly extracted minimum coverage value [2, 10] is the same as the anomaly degree of the previously extracted minimum coverage value [1, 10], the extracting unit 12 excludes the newly extracted minimum coverage value [2, 10] from the minimum coverage values. With this, among the combinations of "duration, anomaly degree" including the same anomaly degree, only the combination including the minimum "duration" is extracted as the minimum coverage value. Therefore, in the case of the anomaly degree "10", only [1, 10] is extracted as the minimum coverage value.

Subsequently, as shown in FIG. 9, the extracting unit 12 further increases the duration by "+1" to set a window W of a duration "3", and obtains the maximum value of the degree of anomaly while sliding the window W on the anomaly degree graph. That is to say, the extracting unit 12 obtains the maximum value of the degree of anomaly when the duration "3" is kept. Then, in the case of the duration "3", the maximum value of the degree of anomaly is "9" as shown in FIG. 9. Consequently, [3, 9] is extracted as the minimum coverage value that is the combination of "duration, anomaly degree".

Then, the extracting unit 12 repeats extraction of the minimum coverage value with a window W obtained by increasing the duration by "+1" as described above until the duration reaches the "maximum value of duration" set as described above. Consequently, as one example, as shown in FIG. 12, a plurality of candidates for a threshold value such as "1, 10", "3, 9", "4, 3", "7, 1", and "9, 0" are extracted as the minimum coverage value in the normal period.

Further, the extracting unit 12 extracts a candidate for a threshold value that is a combination of "value of anomaly degree" and "duration" to be the limit for determining that the measurement target P is in an anomalous state by using the anomaly degree graph of an anomalous period in which the measurement target P is determined to be in the anomalous state set as described above. Herein, the threshold value that is the combination of "value of anomaly degree" and "duration" will be referred to as a "maximum coverage value" (also referred to as an "anomalous period maximum value" hereinafter). A method for extracting the maximum coverage value will be described below with reference to FIGS. 10 to 11A.

First, the extracting unit 12 targets each anomalous period in the anomaly degree graph for the extraction process. That is to say, the extracting unit 12 extracts the maximum coverage value for each anomalous period. In an example shown by FIGS. 10 to 11A, the extracting unit 12 targets only one anomalous period for the process of extracting the maximum coverage value, but in a case where there are a plurality of anomalous periods, the extracting unit 12 extracts the maximum coverage value separately for each anomalous period.

Subsequently, the extracting unit 12 sets a window W of a duration having the "maximum value of duration" set as described above on the anomaly degree graph, and obtains the maximum value of the degree of anomaly within the window W. For example, as shown in FIG. 10, the extracting unit 12 first sets a window W of a duration "10" that is the anomalous period, and obtains the maximum value of the degree of anomaly while sliding the window W on the anomaly degree graph. Then, in the case of the duration "10", the maximum value of the degree of anomaly is "2" as shown in FIG. 10. Consequently, as the maximum coverage value that is the combination of "duration, anomaly degree", [10, 2] is extracted first.

Figure 11A:
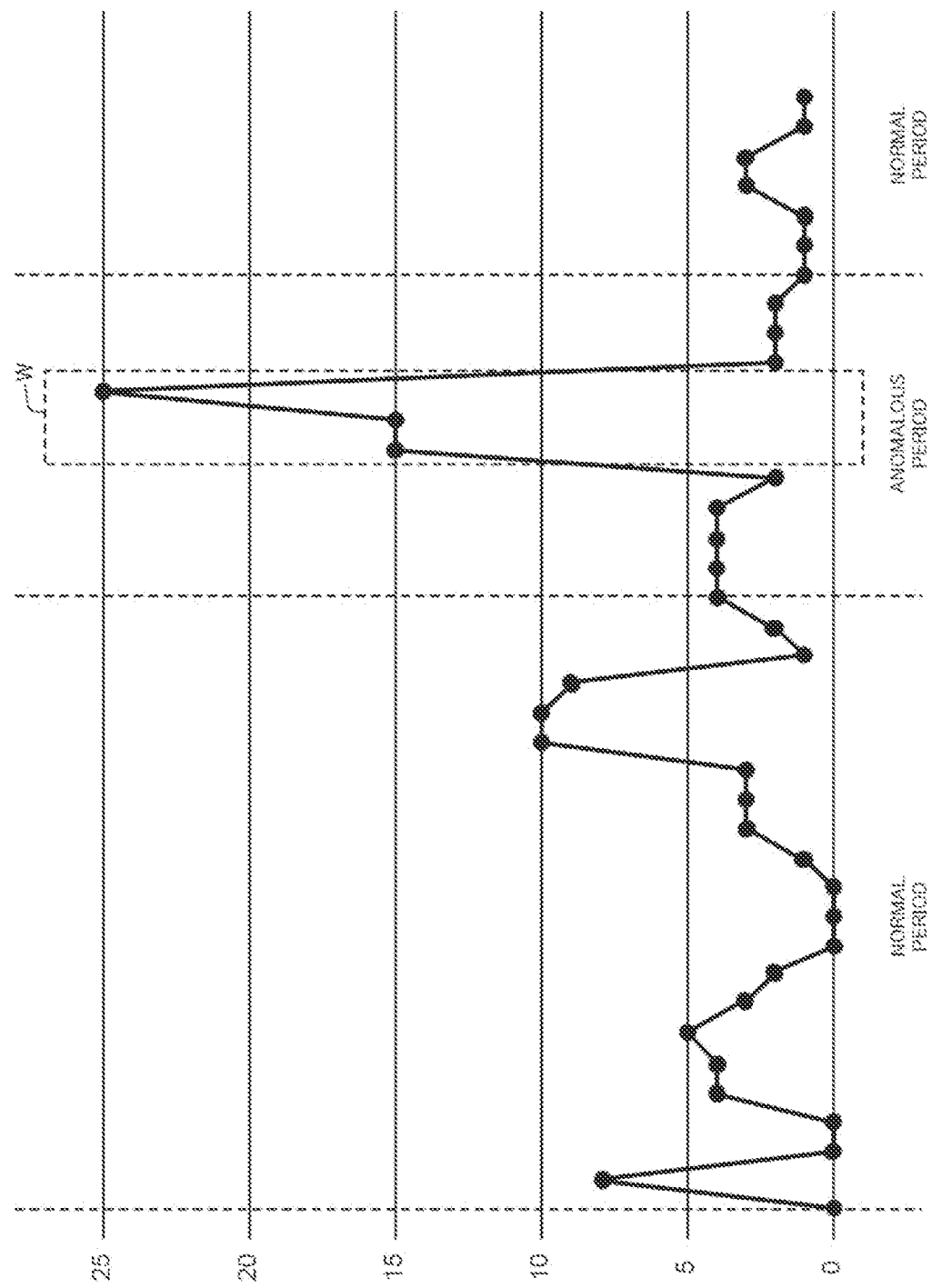
FIG. 11A is a view showing an image of processing of the time series data by the time series data processing apparatus disclosed in FIG. 4.

After that, the extracting unit 12 repeats decreasing the duration by "−1" to set a window W and obtaining the maximum value of the degree of anomaly while sliding the window W on the anomaly degree graph. FIG. 11A shows an example of setting a window W of a duration "3" and obtaining the maximum value of the degree of anomaly while sliding the window W on the anomaly degree graph. Then, in the case of the duration "3", the maximum value of the degree of anomaly is "15" as shown in FIG. 11A. Consequently, [3, 15] is extracted as the maximum coverage value that is the combination of "duration, anomaly degree". Likewise, [1, 25] is extracted as the maximum coverage value.

Consequently, as one example, as shown in FIG. 12, a plurality of maximum coverage values "1, 25", "3, 15" and "10, 2" in an "anomalous period 1" that is one anomalous period are extracted.

In a case where there is still another anomalous period, the extracting unit 12 also performs extraction of the maximum coverage value on the anomalous period in the same manner as described above. For example, in a case where there is an "anomalous period 2" that is another anomalous period on the anomaly degree graph, which is not illustrated, a maximum coverage value "1, 40" in the "anomalous period 2" is extracted.

The calculating unit 13 determines to set which of the candidates for the threshold value, which are all the minimum coverage values extracted from the normal period as described above, as the threshold value. At this time, the calculating unit 13 calculates, for each minimum coverage value, a margin value representing the degree of margin for each maximum coverage value extracted for each anomalous period, and determines a threshold value based on the margin value. A specific example of processing by the calculating unit will be described below.

First, the calculating unit 13 selects one of all the minimum coverage values. Then, the calculating unit 13 calculates, with respect to the selected minimum coverage value, a margin value for each of all the maximum values for each anomalous period. At this time, the calculating unit 13 compares "duration" and "anomaly degree" that are the parameters included by the minimum coverage value and the maximum coverage value, selects either "duration" or "anomaly degree" that has less margin, and calculates its ratio as a margin value. Here, as shown below, the calculating unit 13 sets the degree of margin from the value of the parameter included by the minimum coverage value or calculates the degree of margin of the parameter included by the minimum coverage value for the maximum coverage value in accordance with a preset standard, and determines that, as the value of the degree of margin is a larger value, it has less margin. Considering as an example a case where [1, 10] is selected as the minimum coverage value (a case where it is determined to be normal up to anomaly degree 10), the calculating unit 13 calculates a margin value between the minimum coverage value [1, 10] (w0) and each of the maximum coverage values [1, 25] (w1), [3, 15] (w2) and [10, 2] (w3) of the anomalous period 1 (see FIG. 11B). At this time, the "duration" of the minimum coverage value [1, 10] is "1" and a value less than that cannot be considered, so that the degree of margin thereof is defined as infinite and a margin value is "0". Therefore, the calculating unit 13 determines that "anomaly degree" has less margin than "duration", and calculates the ratio of "anomaly degree" as a margin value. Here, it is assumed that as the margin value is smaller, the margin is more.

Then, the margin values between the minimum coverage value [1, 10] (w0) and the respective maximum coverage values [1, 25] (w1), [3, 15] (w2) and [10, 2] (w3) of the anomalous period 1 are MAX (0, 10/25)=0.4, MAX (0, 10/15)=0.66 and MAX (0, 10/2)=5. Then, the calculating unit 13 sets the lowest value, that is, the value having the most margin among the calculated margin values as the margin value of the selected minimum coverage value for the targeted anomalous period. In this case, the margin value of the minimum coverage value [1, 10] (w0) for the anomalous period 1 is "0.4" (see FIG. 11B).

Further, the calculating unit 13 also calculates a margin value of the selected minimum coverage value [1, 10] for the maximum coverage value [1, 40] in the anomalous period 2. Then, the margin value is MAX (0, 10/40)=0.25 based on the same calculation as described above.

Then, the calculating unit 13 determines, with respect to the selected minimum coverage value, the maximum value among the margin values calculated for the respective anomalous periods as the margin value of the selected minimum coverage value. That is to say, with respect to the minimum coverage value [1, 10], the maximum value "0.4" among the margin value "0.4" calculated for the anomalous period 1 and the margin value "0.25" calculated for the anomalous period 2 becomes the margin value.

Subsequently, the calculating unit 13 selects the next minimum coverage value, and calculates a margin value of the selected minimum coverage value for each of all the maximum coverage values for each of the anomalous periods in the same manner as described above. At this time, considering a case where [3, 9] is selected as the minimum coverage value, the calculating unit 13 calculates a margin value between the minimum coverage value [3, 9] and each of the maximum coverage values [1, 25], [3, 15] and [10, 2] of the anomalous period 1. Then, the margin values are MAX (3/1, 9/25)=3, MAX (3/3, 9/15)=1 and MAX (3/10, 9/2)=4.5. Then, the calculating unit 13 sets the lowest value, that is, the value having the most margin among the calculated margin values as the margin value of the selected minimum coverage value for the targeted anomalous period. In this case, the margin value of the minimum coverage value [3, 9] for the anomalous period 1 is "1".

Further, the calculating unit 13 also calculates a margin value of the selected minimum coverage value [3, 9] for the maximum coverage value [1, 40] in the anomalous period 2 in the same manner as described above. Then, the margin value for the anomalous period 2 is MAX (3/1, 9/40)=3 based on the same calculation as described above. Then, the calculating unit 13 determines the maximum value "3" of the margin values calculated for the respective anomalous periods as the margin value of the minimum coverage value [3, 9].

When margin values are calculated with respect to all the minimum coverage values in the above manner, the margin values are as shown in the rightmost column in FIG. 13. Then, the calculating unit 13 further determines a minimum coverage value having the minimum margin value among all the minimum coverage values, as the threshold value. In this example, the margin value "0.4" is the minimum value, so that the minimum coverage value [1, 10] is determined as the threshold value.

The processing by the acquiring unit 11, the extracting unit 12, and the calculating unit 13 described above may be performed on another anomaly degree graph generated from the time series data set acquired from the measurement target P based on an analysis parameter different from the above. Then, a threshold value may be determined from among candidates of minimum coverage values extracted in the same manner as described above from the other anomaly degree graph generated based on the different analysis parameter. In addition to this, the calculating unit 13 may determine, from among threshold values determined for the respective anomaly degree graphs generated based on the respective analysis parameters, the smallest value as a final threshold value and determine the analysis parameter for generating the anomaly degree graph as an optimum parameter.

The monitoring unit 14 performs monitoring by analyzing whether or not an anomalous state has occurred in the measurement target P based on a time series data set measured from the monitoring target P by using the threshold value determined as described above. Specifically, the monitoring unit 14 includes an analyzing unit 14a, a determining unit 14b, and an output unit 14c. As described above, the analyzing unit 14a calculates a degree of anomaly from a time series data set measured from the measurement target P, and checks whether or not both the value of the degree of anomaly and a duration that the value of the degree of anomaly is kept exceed the threshold value. When the value of the calculated degree of anomaly and the value of the duration exceed the threshold value, the determining unit 14b determines that the measurement target P is in an anomalous state. When it is determined that the measurement target P is in an anomalous state, the output unit 14c outputs the fact. For example, the output unit 14c outputs so as to transmit notification information representing the occurrence of an anomaly to a registered email address of a monitoring person or display the notification information on a display screen of a monitoring device operated by a monitoring person connected to the time series data processing apparatus 10.

[Operation]

Figure 14:
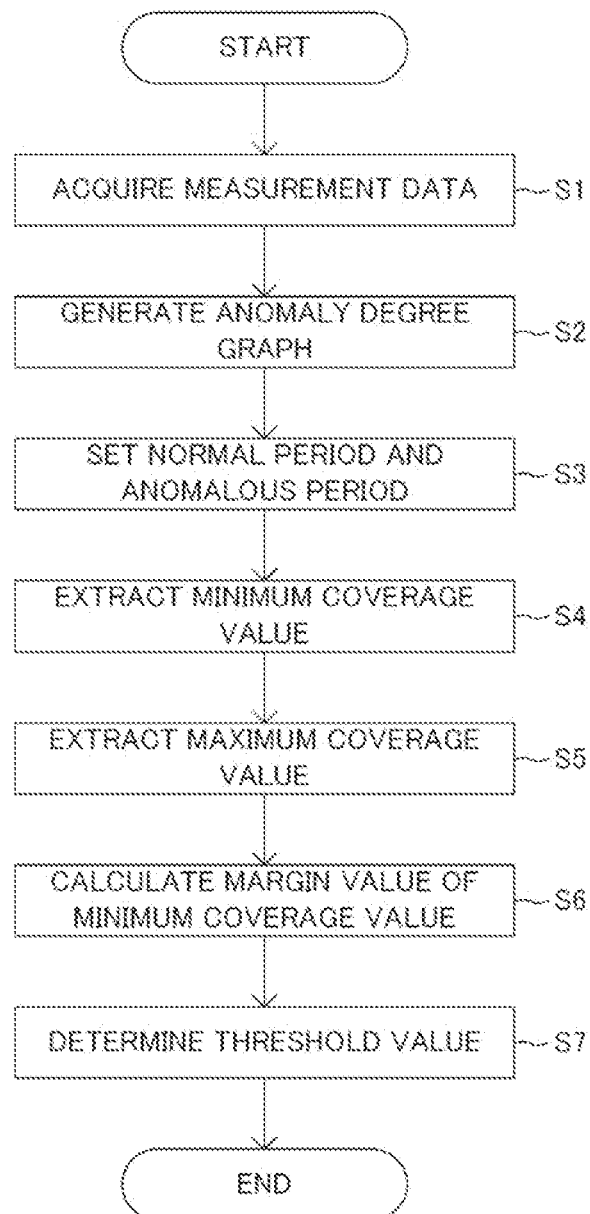
FIG. 14 is a flowchart showing an operation of the time series data processing apparatus disclosed in FIG. 4.
Figure 15:
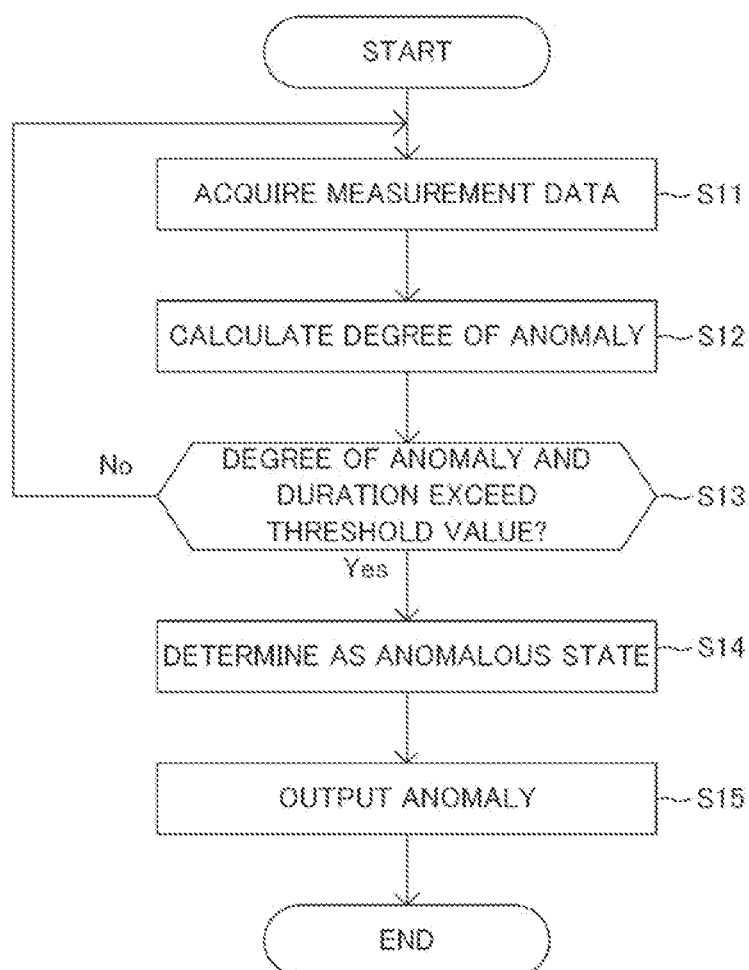
FIG. 15 is a flowchart showing an operation of the time series data processing apparatus disclosed in FIG. 4.

Next, an operation of the time series data processing apparatus 10 will be described mainly with reference to flowcharts of FIGS. 14 and 15. First, an operation in determining a threshold value for determining whether the measurement target P is in an anomalous state will be described with reference to the flowchart of FIG. 14.

The time series data processing apparatus 10 acquires the measurement values of the respective data items measured by various kinds of sensors installed in the measurement target P at predetermined time intervals as a time series data set, and stores into the measurement data storing unit 15 (step S1). Then, the time series data processing apparatus 10 calculates the degree of anomaly at each time from the acquired time series data set, and generates an anomaly degree graph that is time series data (step S2). At this time, the time series data processing apparatus 10 generates an anomaly degree graph in which a normal period and an anomalous period are set (step S3).

Subsequently, the time series data processing apparatus 10 extracts a minimum coverage value to be a candidate for a threshold from the normal period in the anomaly degree graph (step S4). At this time, as shown in FIGS. 6 to 9, the time series data processing apparatus 10 slides a window W of each duration on the anomaly degree graph to specify the maximum value of the degree of anomaly in the duration, and extracts a minimum coverage value including parameters [duration, anomaly degree]. The time series data processing apparatus 10 extracts, from among combinations of "duration, anomaly degree" including the same anomaly degree, only a combination including the smallest "duration" as a minimum coverage value. With this, a plurality of minimum coverage values are extracted, for example, as shown in FIG. 12.

Subsequently, the time series data processing apparatus 10 extracts a maximum coverage value from the anomalous period in the anomaly degree graph (step S5). At this time, as shown in FIGS. 10 to 11A, the time series data processing apparatus 10 slides a window W of each duration on the anomaly degree graph to specify the maximum value of the degree of anomaly in the duration, and extracts a maximum coverage value including parameters [duration, anomaly degree]. With this, a plurality of maximum coverage values are extracted, for example, as shown in FIG. 12. The time series data processing apparatus 10 extracts a maximum coverage value for each anomalous state in the anomaly degree graph.

Figure 11B:
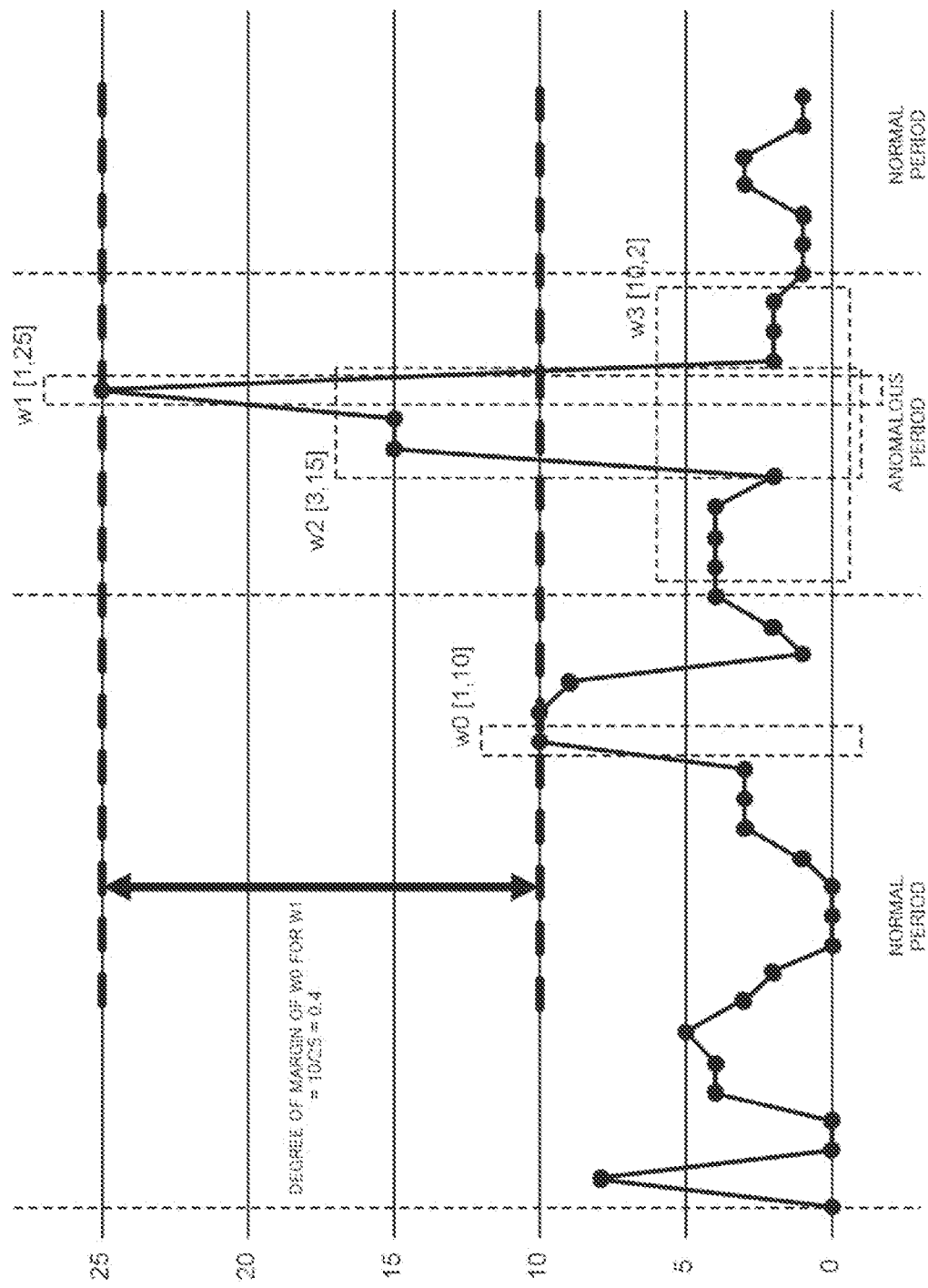
FIG. 11B is a view showing an image of processing of the time series data by the time series data processing apparatus disclosed in FIG. 4.

Subsequently, the time series data processing apparatus 10 determines to set which of candidates for the threshold value, which are all the minimum coverage values extracted from the normal period, as the threshold value. For this, the time series data processing apparatus 10 calculates a margin value representing the degree of margin of each minimum coverage value for each maximum coverage value extracted for each anomalous period (step S6). Then, the time series data processing apparatus 10 sets the lowest value, that is, a value indicating the most margin among the calculated margin values as a margin value of the selected minimum coverage value with respect to the targeted anomalous period. In this manner, the time series data processing apparatus 10 calculates a margin value of each minimum coverage value with respect to each anomalous period as shown in FIGS. 11B and 13. Furthermore, as shown in the rightmost column of FIG. 13, the time series data processing apparatus 10 calculates the highest value among the margin values of each minimum coverage value with respect to all the anomalous periods as a final margin value.

Then, the time series data processing apparatus 10 determines, among the final margin values calculated for all the minimum coverage values, a minimum coverage value to be the smallest value as the threshold value (step S7).

Next, a process of analyzing and monitoring the state of the measurement target P will be described with reference to the flowchart of FIG. 15. First, the time series data processing apparatus 10 acquires a time series data set measured newly from the measurement target P (step S11), and calculates the degree of anomaly at each time (step S12).

Then, the time series data processing apparatus 10 checks whether or not both the calculated degree of anomaly and a duration thereof exceed the threshold value determined as described above (step S13). Then, when the value of the calculated degree of anomaly and the value of the duration exceed the threshold value (step S13, Yes), the time series data processing apparatus 10 determines that the measurement target P is in an anomalous state (step S14). Furthermore, the time series data processing apparatus 10 outputs a fact that the anomalous state has occurred (step S15).

As described above, according to the present invention, candidates for a threshold value of a parameter that allows determination of an anomalous state are extracted from a normal period during which the measurement target P is in a normal state on an anomaly degree graph calculated from measurement values measured in the measurement target P. Therefore, even if an anomalous state rarely occurs in the measurement target P, candidates for an appropriate threshold value can be extracted from the data of the normal period, and an appropriate threshold value can be determined from among the candidates.

Further, according to the present invention, the maximum value of a parameter that allows determination of an anomalous state is extracted from an anomalous period during which the measurement target P is in an anomalous state on the anomaly degree graph, and the threshold value is determined from among the candidates for the threshold value by using the maximum value. By thus considering the value of the anomalous state, a more appropriate threshold value can be determined.

Second Example Embodiment

Figure 16:
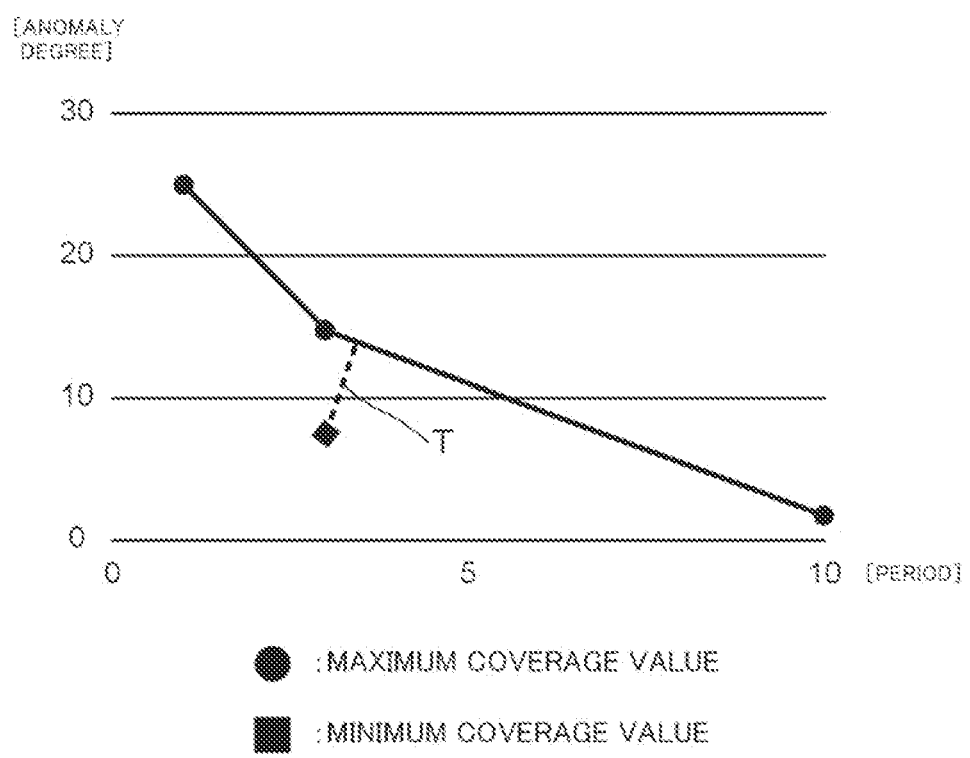
FIG. 16 is a view showing an example of other processing of time series data by a time series data processing apparatus in a second example embodiment of the present invention.

Next, a second example embodiment of the present invention will be described with reference to FIG. 16. FIG. 16 is a view for describing a processing operation of a time series data processing apparatus in the second example embodiment.

The time series data processing apparatus in this example embodiment has the same configuration as the configuration shown in FIG. 4 described in the above first example embodiment. However, this example embodiment is different from the first example embodiment in the method for determining a threshold value from minimum coverage values extracted as candidates for the threshold value. For example, as shown in FIG. 16, the calculating unit 13 in this example embodiment first locates all the maximum coverage values on a graph and connects them by a straight line. Then, the calculating unit 13 calculates a length T from each minimum coverage value to the straight line connecting the maximum coverage values, and determines a minimum coverage value of the largest length T as the threshold value.

However, the abovementioned method for determining a threshold value from minimum coverage values is an example and, according to the present invention, one threshold value may be determined from a plurality of minimum coverage values by any method. Moreover, although a threshold value is determined by calculating a margin value of a minimum coverage value by using a maximum coverage value in the above description, the method is not necessarily limited to using a maximum coverage value. That is to say, according to the present invention, by extracting only minimum coverage values without extracting maximum coverage values, one threshold value may be determined by any method from the minimum coverage values. As an example, the calculating unit 13 may set priorities for a plurality of parameters included by a minimum coverage value, and determine a minimum coverage value whose parameter with the highest priority is the maximum value as a threshold value. Alternatively, as another example, the calculating unit 13 may assign a weight corresponding to a priority set for each parameter to the value of the parameter, and determine a minimum coverage value in which the value is maximum as a threshold value. In a case where a minimum coverage value that can be extracted is only one, the calculating unit 13 may determine the one minimum coverage value as a threshold value.

Third Example Embodiment

Figure 17:
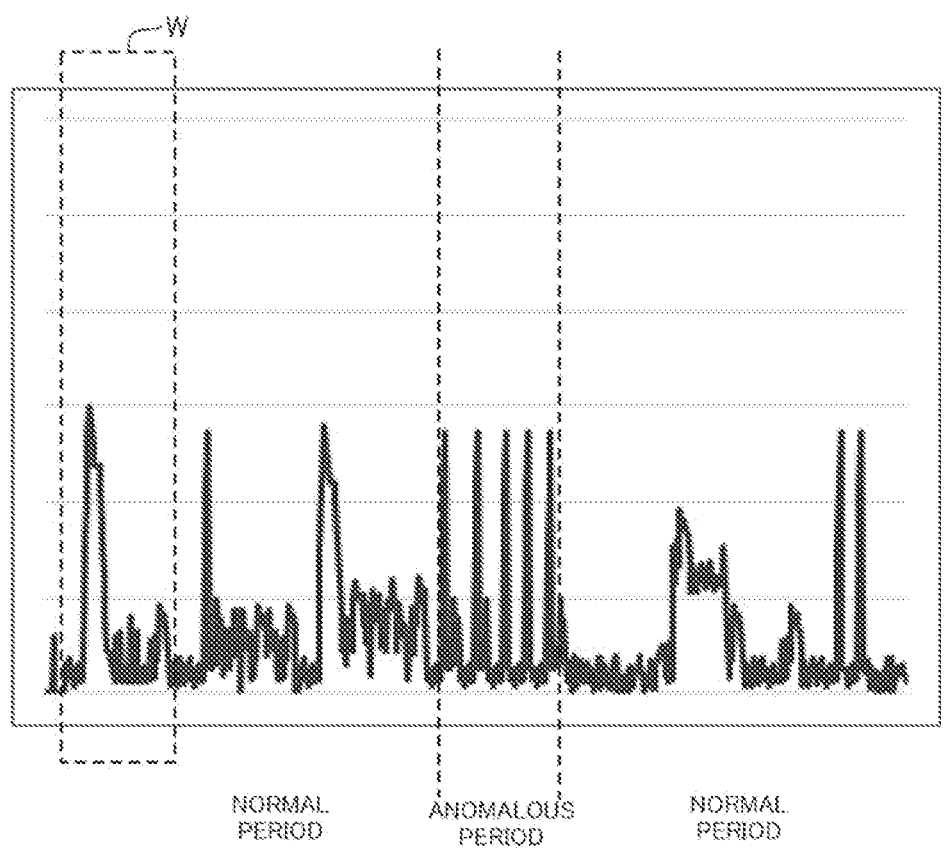
FIG. 17 is a view showing an example of other processing of time series data by a time series data processing apparatus in a third example embodiment of the present invention.

Next, a third example embodiment of the present invention will be described with reference to FIG. 17. FIG. 17 is a view for describing a processing operation of a time series data processing apparatus in the third example embodiment.

The time series data processing apparatus in this example embodiment has the same configuration as the configuration shown in FIG. 4 described in the above first example embodiment. However, this example embodiment is different from the first and second example embodiments in a parameter that is focused on in detecting an anomalous state from an anomaly degree graph that is time series data. For example, in this example embodiment, an anomalous state is detected based on a combination of "anomaly degree" (a predetermined parameter) and "number of increases in anomaly degree per unit time" (another parameter) on the anomaly degree graph as shown in FIG. 17.

For this, in this example embodiment, the extracting unit 12 extracts a combination of "anomaly degree" and "number of increases in anomaly degree per unit time" as a minimum coverage value (normal period maximum value) in a normal period of an anomaly degree graph. For example, as shown in FIG. 17, the extracting unit 12 sets a window W per unit time on an anomaly degree graph, and slides the window W to extract the value of "anomaly degree" in the window W and "number of increases" up to the value of the anomaly degree as a minimum coverage value. At this time, the extracting unit 12 extracts a combination of each "anomaly degree" and the maximum value of the "number of increases" as a minimum coverage value. Likewise, the extracting unit 12 extracts a combination of "anomaly degree" and "number of increases in anomaly degree per unit time" as a maximum coverage value (anomalous period maximum value) in an anomalous period of the anomaly degree graph.

Then, one of the minimum coverage values extracted as described above is determined as a threshold value. At this time, a minimum average value to be a threshold value may be determined by calculating a margin degree of each minimum coverage value for each maximum coverage value (margin of anomaly degree, margin of number of increases), or may be determined by any method. With this, it is possible to set a threshold value by a combination of a threshold value of "anomaly degree" and a threshold value of "number of increases in anomaly degree per unit time".

However, according to the present invention, a parameter that is focused on in detecting an anomalous state from an anomaly degree graph that is time series data may be any parameter. Along with this, a combination of parameters extracted as a minimum coverage value and a maximum coverage value may also be any parameters. For example, as a combination of parameters, the cumulative value of anomaly degrees per unit time in an anomaly degree graph and the number of times that the cumulative value exceeds a set threshold value may be used. Moreover, as a combination of parameters, the rate of change of an anomaly degree per unit time and the number of times that the rate of change exceeds a set threshold Further, although an anomaly degree graph is used as time series data in this example embodiment, time series data is not necessarily limited to an anomaly degree graph, and may be any time series data including any parameter. For example, by handling a measurement value of a predetermined data item measured in the measurement target P as time series data, and performing a process of extracting a minimum coverage value on the time series data in the same manner as described above, a threshold value for determining an anomaly may be set.

Fourth Example Embodiment

Figure 18:
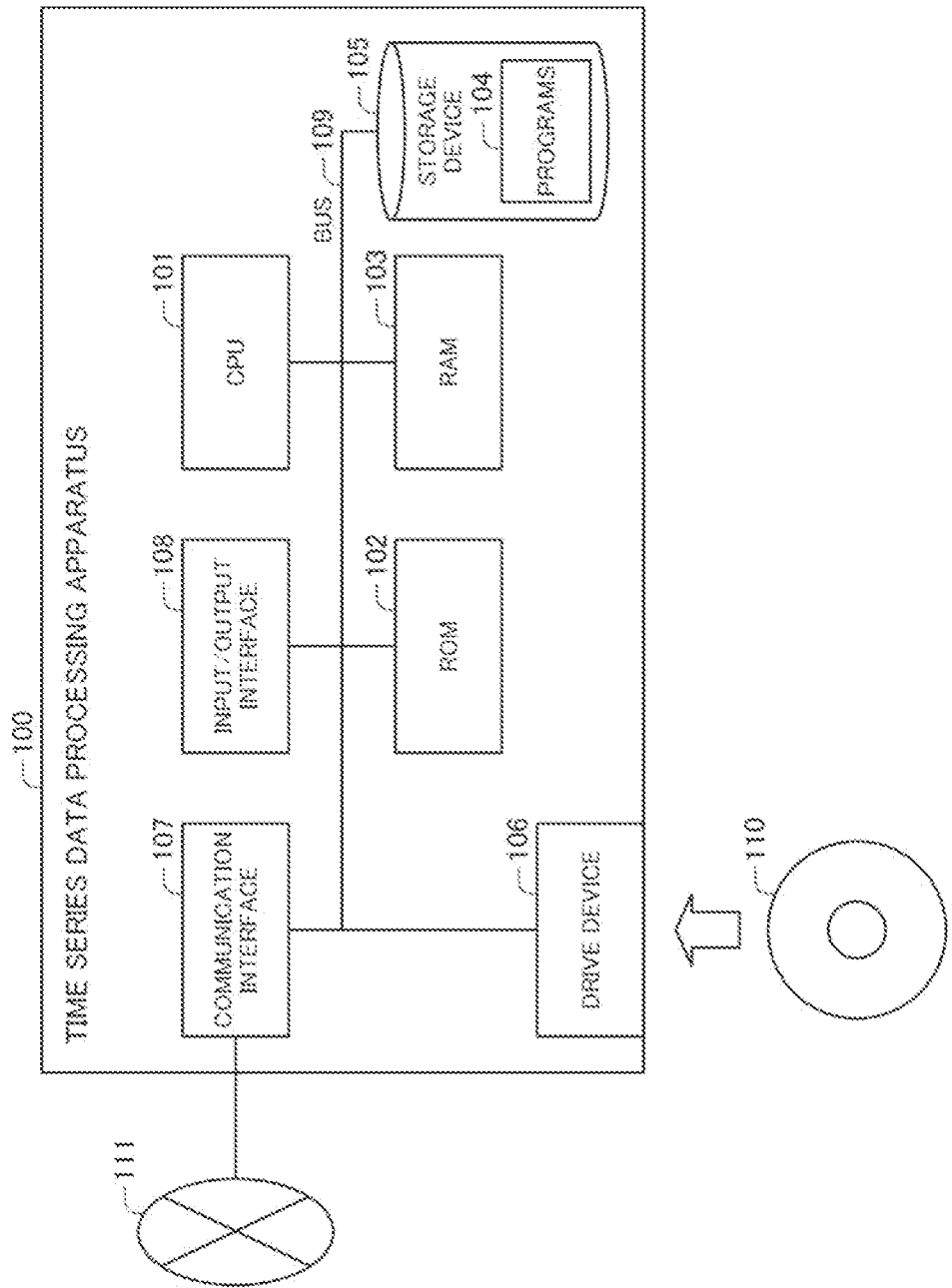
FIG. 18 is a block diagram showing a hardware configuration of a time series data processing apparatus in a fourth example embodiment of the present invention.
Figure 19:
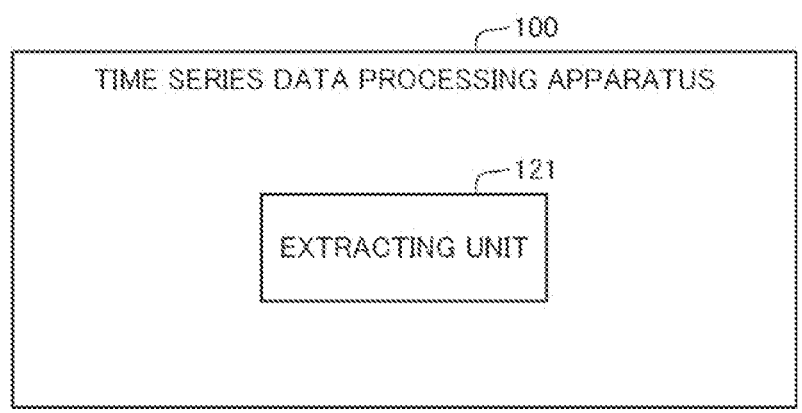
FIG. 19 is a block diagram showing a configuration of the time series data processing apparatus in the fourth example embodiment of the present invention.
Figure 20:
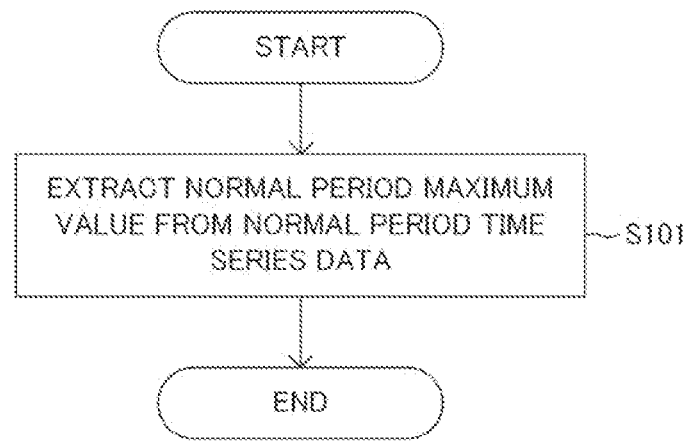
FIG. 20 is a flowchart showing an operation of the time series data processing apparatus in the fourth example embodiment of the present invention.

Next, a fourth example embodiment of the present invention will be described with reference to FIGS. 18 to 20. FIGS. 18 to 19 are block diagrams showing a configuration of a time series data processing apparatus in the fourth example embodiment, and FIG. 20 is a flowchart showing an operation of the time series data processing apparatus. In this example embodiment, the overview of the configurations of the time series data processing apparatus and the time series data processing method described in the respective example embodiments is shown.

First, a hardware configuration of a time series data processing apparatus 100 in this example embodiment will be described with reference to FIG. 18. The time series data processing apparatus 100 is configured by a general information processing apparatus and, as an example, includes a hardware configuration as shown below;

a CPU (Central Processing Unit) 101 (arithmetic logic unit),
a ROM (Read Only Memory) 102 (storage unit),
a RAM (Random Access Memory) 103 (storage unit),
programs 104 loaded to the RAM 103,
a storage device 105 for storing the programs 104,
a drive device 106 reading from and writing into a storage medium 110 outside the information processing apparatus,
a communication interface 107 connected to a communication network 111 outside the information processing apparatus,
an input/output interface 108 performing input and output of data, and
a bus 109 connecting the respective components.

Then, the time series data processing apparatus 100 can structure and include an extracting unit 121 shown in FIG. 19 by the CPU 101 acquiring and executing the programs 104. The programs 104 are, for example, stored in the storage device 105 or the ROM 102 in advance, and the CPU 101 loads to the RAM 103 and executes as necessary. Alternatively, the programs 104 may be supplied to the CPU 101 via the communication network 111, or may be stored in the storage medium 110 in advance and retrieved and supplied to the CPU 101 by the drive device 106. The abovementioned extracting unit 121 may be structured by an electronic circuit.

FIG. 18 shows an example of the hardware configuration of the information processing apparatus serving as the time series data processing apparatus 100, and the hardware configuration of the information processing apparatus is not limited to the abovementioned case. For example, the information processing apparatus may be configured by part of the above configuration, such as excluding the drive device 106.

The time series data processing apparatus 100 executes a time series data processing method shown in the flowchart of FIG. 20 by a function of the extracting unit 121 structured by the programs as described above.

As shown in FIG. 20, the time series data processing apparatus 100 executes a process of extracting, from normal period time series data that is time series data of a period during which a measurement target is determined to be in a normal state of time series data including a plurality of parameters based on data measured from the measurement target, a combination of the parameters in which a value of another parameter with respect to a value of a predetermined parameter is maximum among combinations of the parameters, as a normal period maximum value (step S1).

With the configurations as described above, the present invention enables extraction of, from data at a time when a measurement target is in a normal state of time series data including a plurality of parameters, a value at which a certain parameter is maximum as a candidate for a threshold value. Therefore, it is possible to extract a candidate for a threshold value without using data at a time when the measurement target is in an anomalous state, and it is possible to determine an appropriate threshold value.

<Supplementary Notes>

The whole or part of the example embodiments disclosed above can be described as the following supplementary notes. Below, the overview of configurations of a time series data processing method, a time series data processing apparatus, and a program according to the present invention will be described. However, the present invention is not limited to the following configurations.

(Supplementary Note 1)

A time series data processing method comprising
extracting, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

(Supplementary Note 2)

The time series data processing method according to Supplementary Note 1, comprising
extracting, for each value of the predetermined parameter, a combination of the plurality of parameters in which a value of the other parameter with respect to the value of the predetermined parameter is maximum as the normal period maximum value from the normal period time series data.

(Supplementary Note 3)

The time series data processing method according to Supplementary Note 2, comprising
excluding, among the normal period maximum values including the other parameters of same values, a combination of the plurality of parameters other than a combination of the plurality of parameters including the predetermined parameter of a minimum value, from the normal period maximum values.

(Supplementary Note 4)

The time series data processing method according to any of Supplementary Notes 1 to 3, wherein
any of the normal period maximum values is set as a threshold value for determining that the measurement target is in an anomalous state in the time series data including the plurality of parameters.

(Supplementary Note 5)

The time series data processing method according to Supplementary Note 4, comprising:
extracting, from anomalous period time series data that is time series data of a period during which the measurement target is determined to be in an anomalous state of the time series data, a combination of the plurality of parameters in which a value of the other parameter with respect to a value of the predetermined parameter is maximum among combinations of the plurality of parameters, as an anomalous period maximum value; and
setting any of the normal period maximum values as the threshold value based on the normal period maximum values and the anomalous period maximum value.

(Supplementary Note 6)

The time series data processing method according to Supplementary Note 5, comprising
extracting, for each value of the predetermined parameter, a combination of the plurality of parameters in which a value of the other parameter with respect to the value of the predetermined parameter is maximum as the anomalous period maximum value from the anomalous period time series data.

(Supplementary Note 7)

The time series data processing method according to Supplementary Note 5 or 6, comprising
extracting, from the anomalous period time series data of each anomalous state of the measurement target, the anomalous period maximum value for the anomalous state of the measurement target.

(Supplementary Note 8)

The time series data processing method according to any of Supplementary Notes 5 to 7, comprising:
calculating, with respect to a value of any parameter in the respective normal period maximum values, a margin value that is a value based on a ratio of the value to a value of the parameter in each of the anomalous period maximum values; and
setting any of the normal period maximum values as the threshold value based on the margin value.

(Supplementary Note 9)

The time series data processing method according to any of Supplementary Notes 1 to 8, wherein
the other parameter is a degree of anomaly that is a value representing a degree to which the measurement target is in an anomalous state calculated from the measured data, and the predetermined parameter is a period during which a value of the degree of anomaly is kept.

(Supplementary Note 10)

A time series data processing apparatus comprising
an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

(Supplementary Note 11)

The time series data processing apparatus according to Supplementary Note 10, comprising
a calculating unit configured to set any of the normal period maximum values as a threshold value for determining that the measurement target is in an anomalous state in the time series data including the plurality of parameters.

(Supplementary Note 12)

The time series data processing apparatus according to Supplementary Note 11, wherein:
the extracting unit is configured to extract, from anomalous period time series data that is time series data of a period during which the measurement target is determined to be in an anomalous state of the time series data, a combination of the plurality of parameters in which a value of the other parameter with respect to a value of the predetermined parameter is maximum among combinations of the plurality of parameters, as an anomalous period maximum value; and
the calculating unit is configured to set any of the normal period maximum values as the threshold value based on the normal period maximum values and the anomalous period maximum value.

(Supplementary Note 13)

The time series data processing apparatus according to Supplementary Note 12, wherein
the calculating unit is configured to calculate, with respect to a value of any parameter in the respective normal period maximum values, a margin value that is a value based on a ratio of the value to a value of the parameter in each of the anomalous period maximum values, and set any of the normal period maximum values as the threshold value based on the margin value.

(Supplementary Note 14)

A computer program comprising instructions for causing an information processing apparatus to realize an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

(Supplementary Note 15)

The computer program according to Supplementary Note 14, comprising instructions for causing the information processing apparatus to further realize a calculating unit configured to set any of the normal period maximum values as a threshold value for determining that the measurement target is in an anomalous state in the time series data including the plurality of parameters.

(Supplementary Note 16)

A time series data processing system comprising an extracting unit configured to extract, from normal period time series data that is time series data of a period during which a measurement target is determined to be in a normal state of time series data including a plurality of parameters based on data measured from the measurement target, a combination of the plurality of parameters in which a value of another parameter with respect to a value of a predetermined parameter is maximum among combinations of the plurality of parameters, as a normal period maximum value.

(Supplementary Note 17)

The time series data processing system according to Supplementary Note 16, comprising a calculating unit configured to set any of the normal period maximum values as a threshold value for determining that the measurement target is in an anomalous state in the time series data including the plurality of parameters.

(Supplementary Note 18)

The time series data processing system according to Supplementary Note 17, wherein:

the extracting unit is configured to extract, from anomalous period time series data that is time series data of a period during which the measurement target is determined to be in an anomalous state of the time series data, a combination of the plurality of parameters in which a value of the other parameter with respect to a value of the predetermined parameter is maximum among combinations of the plurality of parameters, as an anomalous period maximum value; and the calculating unit is configured to set any of the normal period maximum values as the threshold value based on the normal period maximum values and the anomalous period maximum value.

(Supplementary Note 19)

The time series data processing system according to Supplementary Note 18, wherein the calculating unit is configured to calculate, with respect to a value of any parameter in the respective normal period maximum values, a margin value that is a value based on a ratio of the value to a value of the parameter in each of the anomalous period maximum values, and set any of the normal period maximum values as the threshold value based on the margin value.

The abovementioned program can be stored by using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). The program may also be supplied to a computer by various types of transitory computer-readable mediums. Examples of the transitory computer-readable mediums include an electric signal, an optical signal, and an electromagnetic signal. The transitory computer-readable mediums can supply the program to a computer via a wired communication path such as an electric wire and an optical fiber or a wireless communication path.

Although the present invention has been described above with reference to the example embodiments, the present invention is not limited to the above example embodiments. The configurations and details of the present invention can be changed in various manners that can be understood by one skilled in the art within the scope of the present invention. Moreover, at least one or more functions of the functions of the acquiring unit, the extracting unit, the calculating unit, the measurement data storing unit and the threshold value storing unit may be executed by an information processing apparatus installed and connected at any place on the network, that is, may be executed on so-called cloud computing.

DESCRIPTION OF NUMERALS 10 time series data processing apparatus
11 acquiring unit
11a anomaly degree calculating unit
11b generating unit
12 extracting unit
13 calculating unit
14 monitoring unit
14a analyzing unit
14b determining unit
14c output unit
15 measurement data storing unit
16 threshold value storing unit
100 time series data processing apparatus
101 CPU
102 ROM
103 RAM
104 programs
105 storage device
106 drive device
107 communication interface
108 input/output interface
109 bus
110 storage medium
111 communication network
121 extracting unit

What is claimed is:

1. A time series data processing method comprising:
determining, by a processor, a plurality of first periods during which a measurement target is in a normal state, based on data measured from the measurement target;

determining, by the processor, a second period during which the measurement target is in an anomalous state, based on the data measured from the measurement target and a threshold;

for each first period, extracting, by the processor and from first time series data of the each first period, a first combination of a plurality of parameters in which a first value of a first parameter is maximum for a first given value of a second parameter, as a normal period maximum value;

extracting, by the processor and from second time series data of the second period, a second combination of the plurality of parameters in which a second value of the first parameter is maximum for a second given value of the second parameter, as an anomalous period maximum value;

updating, by the processor, the threshold used to determine whether the measurement target is in the anomalous state, as the normal period maximum value of one of the first periods, based on the normal period maximum value of each first period and based on the anomalous period maximum value; and determining, by the processor, that the measurement target is in the anomalous state based on the updated threshold.

2. The time series data processing method according to claim 1, further comprising:

extracting, by the processor and for each of a plurality of values of the second parameter other than the first given value, another first combination of the plurality of parameters in which a value of the first parameter other than the first value is maximum for the value of the second parameter, as the normal period maximum value.

3. The time series data processing method according to claim 2, further comprising:

excluding, by the processing and from among the normal period maximum value for each of the plurality of values of the second parameter that is a same value, the combination of the plurality of parameters other than the combination of the plurality of parameters including the second parameter.

4. The time series data processing method according to claim 1, further comprising:

extracting, by the processor and for each a plurality of values of the second parameter, another second combination of the plurality of parameters in which a value of the first parameter other than the second value is maximum for the value of the second parameter, as the anomalous period maximum value.

5. The time series data processing method according to claim 1, further comprising:

extracting, by the processor, the anomalous period maximum value for each of a plurality of the anomalous states of the measurement target.

6. The time series data processing method according to claim 1, comprising:

calculating, by the processor and for each first period in which the normal period maximum value has been extracted, a margin value based on a ratio of the first given value the second parameter to the first value of the first parameter; and setting, by the processor, the normal period maximum value extracted in any of the first periods as the threshold based on the margin value.

7. The time series data processing method according to claim 1, wherein the first parameter is a degree of anomaly representing a degree to which the measurement target is in the anomalous state calculated from the measured data, and the second parameter is a period during which of the degree of anomaly is maintained.

8. An information processing apparatus comprising:

at least one memory configured to store instructions; and
at least one processor configured to execute the instructions to:

determine a plurality of first periods during which a measurement target is in a normal state, based on data measured from the measurement target;

determine a second period during which the measurement target is in an anomalous state, based on the data measured from the measurement target and a threshold;

for each first period, extract, from first time series data of the each first period, a first combination of a plurality of parameters in which a first value of a first parameter is maximum for a first given value of a second, as a normal period maximum value;

extract, from second time series data of the second period, a second combination of the plurality of parameters in which a second value of the first parameter is maximum for a second given value of the second parameter, as an anomalous period maximum value;

update the threshold used to determine whether the measurement target is in the anomalous state, as the normal period maximum value of one of the first periods, based on the normal period maximum value of each first period and based on the anomalous period maximum value; and determine that the measurement target is in the anomalous state based on the updated threshold.

9. The information processing apparatus according to claim 8, wherein the at least one processor is configured to execute the instructions to further:

calculate, for each first period in which the normal period maximum value has been extracted, a margin value based on a ratio of the first given value the second parameter to the first value of the first parameter; and set the normal period maximum value extracted in any of the first periods as the threshold based on the margin value.

10. A non-transitory computer-readable medium storing a program executable by an information processing apparatus to:

determine a plurality of first periods during which a measurement target is in a normal state, based on data measured from the measurement target;

determine a second period during which the measurement target is in an anomalous state, based on the data measured from the measurement target and a threshold;

for each first period, extract, from first time series data of the each first period, a first combination of a plurality of parameters in which a first value of a first parameter is maximum for a first given value of a second parameter, as a normal period maximum value;

extract, from second time series data of the second period, a second combination of the plurality of parameters in which a second value of the first parameter is maximum for a second given value of the second parameter, as an anomalous period maximum value;

update the threshold used to determine whether the measurement target is in the anomalous state, as the normal period maximum value of one of the first periods, based on the normal period maximum value of each first period and based on the anomalous period maximum value; and determine that the measurement target is in the anomalous state based on the updated threshold.

* * * * *